US010561131B2

(12) United States Patent
Onizawa et al.

(10) Patent No.: US 10,561,131 B2
(45) Date of Patent: Feb. 18, 2020

(54) DEVICE FOR A FISHING REEL AND DRAG DEVICE FOR A FISHING REEL USING THE SAME

(71) Applicants: Teijin Limited, Osaka, Osaka (JP); Shimano Inc., Sakai, Osaka (JP)

(72) Inventors: Tomomitsu Onizawa, Osaka (JP); Satoshi Nomura, Osaka (JP); Kunio Takechi, Osaka (JP)

(73) Assignees: Shimano Inc., Osaka (JP); Teijin Limited, Osaka (JP)

(*) Notice: Subject to any disclaimer, the term of this patent is extended or adjusted under 35 U.S.C. 154(b) by 77 days.

(21) Appl. No.: 16/023,936

(22) Filed: Jun. 29, 2018

(65) Prior Publication Data

US 2019/0000057 A1    Jan. 3, 2019

(30) Foreign Application Priority Data

Jun. 30, 2017    (JP) .................................. 2017-129747

(51) Int. Cl.
| | | |
|---|---|---|
| A01K 89/01 | (2006.01) | |
| A01K 89/015 | (2006.01) | |
| C08L 81/04 | (2006.01) | |
| C08G 75/00 | (2006.01) | |
| C08G 75/02 | (2016.01) | |

(52) U.S. Cl.
CPC .......... *A01K 89/0179* (2015.05); *C08G 75/00* (2013.01); *C08G 75/02* (2013.01); *C08L 81/04* (2013.01); *C08K 2201/003* (2013.01); *C08L 2205/16* (2013.01)

(58) Field of Classification Search
CPC .......... C08L 81/04; C08L 27/18; C08L 77/00; C08L 77/06; C08L 2205/16; C08K 7/14; C08K 3/00; C08K 2201/003; C08G 75/00; A01K 89/0179
See application file for complete search history.

(56) References Cited

U.S. PATENT DOCUMENTS

| | | | | |
|---|---|---|---|---|
| 6,286,244 B1* | 9/2001 | Weiss | ..................... | A01K 87/04 156/189 |
| 2005/0058805 A1* | 3/2005 | Kimura | ................. | B29C 70/081 428/113 |
| 2008/0138697 A1* | 6/2008 | Asada | ................... | C03C 14/002 429/479 |
| 2009/0169954 A1* | 7/2009 | Ino | ......................... | H01B 1/122 429/494 |
| 2010/0065317 A1* | 3/2010 | Okada | ....................... | C08J 5/24 174/258 |

(Continued)

FOREIGN PATENT DOCUMENTS

JP    2002-34407 A    2/2002

*Primary Examiner* — Emmanuel M Marcelo
(74) *Attorney, Agent, or Firm* — Global IP Counselors, LLP

(57) ABSTRACT

A device for a fishing reel comprising a resin composition includes a polyarylene sulfide resin composition (component A), a glass fibers (component B) contains 10 to 300 parts by weight of the component B based on 100 parts by weight of the component A, an aramid fibers (component C) contains 1 to 100 parts by weight of the component C based on 100 parts by weight of the component A, and a fluoric resin (component D) contains 5 to 100 parts by weight of the component D based on 100 parts by weight of the component A.

8 Claims, 12 Drawing Sheets

(56) References Cited

U.S. PATENT DOCUMENTS

| | | | |
|---|---|---|---|
| 2011/0173873 A1* | 7/2011 | Nakanishi | A01K 91/00 43/44.98 |
| 2012/0028047 A1* | 2/2012 | Imai | C08J 5/04 428/403 |
| 2013/0040225 A1* | 2/2013 | Onishi | C03C 25/1095 429/509 |
| 2015/0017449 A1* | 1/2015 | Itoh | B32B 15/14 428/416 |
| 2015/0144194 A1* | 5/2015 | Kajisa | H01L 31/0481 136/259 |
| 2015/0305315 A1* | 10/2015 | Iwai | A01K 89/027 242/303 |
| 2015/0340679 A1* | 11/2015 | Shimura | H01G 11/52 429/144 |
| 2017/0158854 A1* | 6/2017 | Ueno | B32B 15/08 |
| 2017/0211225 A1* | 7/2017 | Maeda | C08L 53/00 |

* cited by examiner

DEVICE FOR A FISHING REEL AND DRAG DEVICE FOR A FISHING REEL USING THE SAME

CROSS-REFERENCE TO RELATED APPLICATIONS

This application claims priority to Japanese Patent Application No. 2017-129747, filed on Jun. 30, 2017. The entire disclosure of Japanese Patent Application No. 2017-129747 is hereby incorporated herein by reference.

BACKGROUND

Field of the Invention

The present invention relates to a device for a fishing reel comprising a resin composition which consisting of polyarylene sulfide resin, glass fibers, aramid fibers, and fluororesin, whereby the device is capable of generating a high-quality sound that does not deteriorate even when used over a long period of time, and to a drag device for a fishing reel that uses the device.

Background Art

In general, a drag device for braking the rotation of a spool in the casting direction is disposed on the periphery of a drive shaft in a dual-bearing reel, and the drag device is configured to adjust the torque, which can be transmitted between the drive gear and the drive shaft to suppress the tensile force applied to the fishing line. In addition, prior art is known that includes a sound-generating function that emits a sound to notify when a drag operation occurs, that is, when the spool rotates in the casting direction against the drag force, and the drive gear rotates relative to the drive shaft (for example, refer to Japanese Published Unexamined Application No. 2002-34407).

Polyarylene sulfide resin is an engineering plastic that has excellent slidability, chemical resistance, mechanical properties, and the like, and a device for a fishing reel is being evaluated as a sound generating mechanism formed of this resin.

However, although polyarylene sulfide resin itself has better sliding performance compared to other resins, when used alone, the sliding performance, mechanical properties, impact strength, and weld strength are not sufficient. In general, a high-quality sound is required of the device for a fishing reel. Furthermore, when the fishing reel is used for a long period of time, a problem arises in that friction occurs in the device for a fishing reel due to the emission of sound during use, and the sound deteriorates due to wear. Thus, there is a demand for a device for a fishing reel as a sound generating mechanism, which is capable of generating a high-quality sound that does not deteriorate even when used over a long period of time.

Japanese Published Unexamined Application No. 2015-92830 proposes a drag device for a dual-bearing reel for generating a clear and loud sound, in which a polyphenylene sulfide resin reinforced by a filler such as glass fibers or carbon fibers is used. However, polyphenylene sulfide resin reinforced by a filler such as glass fibers or carbon fibers is insufficient in terms of sliding performance, and the deterioration of sound when used for a long period of time is unsatisfactory.

Japanese Patent Nos. 3618398 and 3901229 propose resin compositions having excellent sliding performance that contain polyphenylene sulfide resin, but the compositions cannot satisfy the sound requirement of the device for a fishing reel of the present patent.

SUMMARY

An object of the present invention is to provide a device for a fishing reel that is capable of generating a high-quality sound that does not deteriorate even when used over a long period of time, and a drag device for a fishing reel that uses the device.

As a result of intensive evaluation, it has been found that a device for a fishing reel comprising a resin composition that mainly contains polyarylene sulfide resin (component A) as a base component, glass fibers, aramid fibers, and fluororesin is capable of generating a high-quality sound that does not deteriorate even when used over a long period of time.

Thus, according to embodiments of the present invention, the object described above is achieved by a first configuration of the invention in which a device for a fishing reel comprising a resin composition that mainly contains polyarylene sulfide resin (component A) as a base component, and glass fibers (component B) which contains 10 to 300 parts by weight of the component B based on 100 parts by weight of the component A, aramid fibers (component C) which contains 100 parts by weight of the component C based on 100 parts by weight of the component A, and fluororesin (component D) which contains 5-100 parts by weight of the component D based on 100 parts by weight of the component A.

One preferred embodiment of the present invention is a second configuration of the invention in which the device for a fishing reel according to the above-described first configuration, wherein the average fiber diameter of component B is 3-10 μm.

One preferred embodiment of the present invention is a third configuration of the invention in which the device for a fishing reel according to the above-described first configurations, wherein the fiber length of component C is 0.7-1.5 mm.

One preferred embodiment of the present invention is a third configuration of the invention in which the device for a fishing reel according to the above-described second configurations, wherein the fiber length of component C is 0.7-1.5 mm.

In addition, the drag device of the fishing reel according to embodiments of the present invention is a device for restricting the relative rotation between the drive shaft and the drive gear interlocking with the spool. The drag device of a fishing reel comprises a drag device, a drag adjustment device, and a sound-generating mechanism.

The sound-generating mechanism comprises a sound generating device that can be integrally rotated with either the drive gear or the drive shaft and that has a sound-generating portion, and a sound unit that can be integrally rotated with the other of the drive gear and the drive shaft and that interferes with the sound-generating portion by relative rotation between the drive gear and the drive shaft to generate sound.

The sound generating device comprising a resin composition that mainly contains polyarylene sulfide resin (component A) as a base component, and glass fibers (component B) which contains 10 to 300 parts by weight of the component B based on 100 parts by weight of the component A, aramid fibers (component C) which contains 100 parts by weight of the component C based on 100 parts by weight of the component A, and fluororesin (component D) which contains 5-100 parts by weight of the component D based on 100 parts by weight of the component A.

According to embodiments of the present invention, it is possible to provide a device for a fishing reel that is capable of generating a high-quality sound that does not deteriorate even when used over a long period of time, and, when the device is used in the sound generating device of the drag device of a fishing reel, it is possible to generate a loud, clear sound when the drag device is operated.

DETAILED DESCRIPTION OF THE EMBODIMENTS

Figure 1:
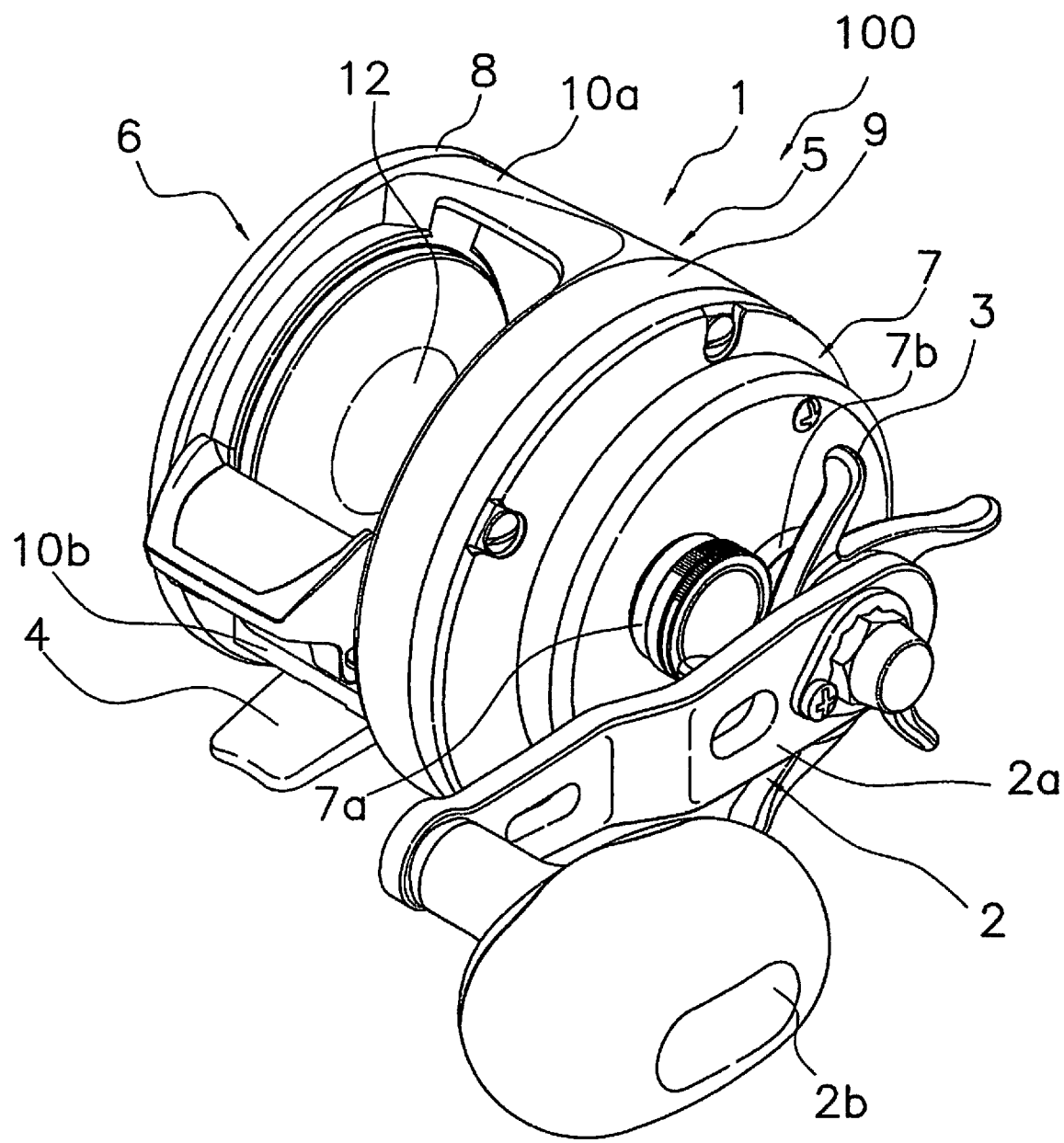
FIG. 1 is a perspective view of a dual bearing reel employing the first embodiment of the present invention.
Figure 2:
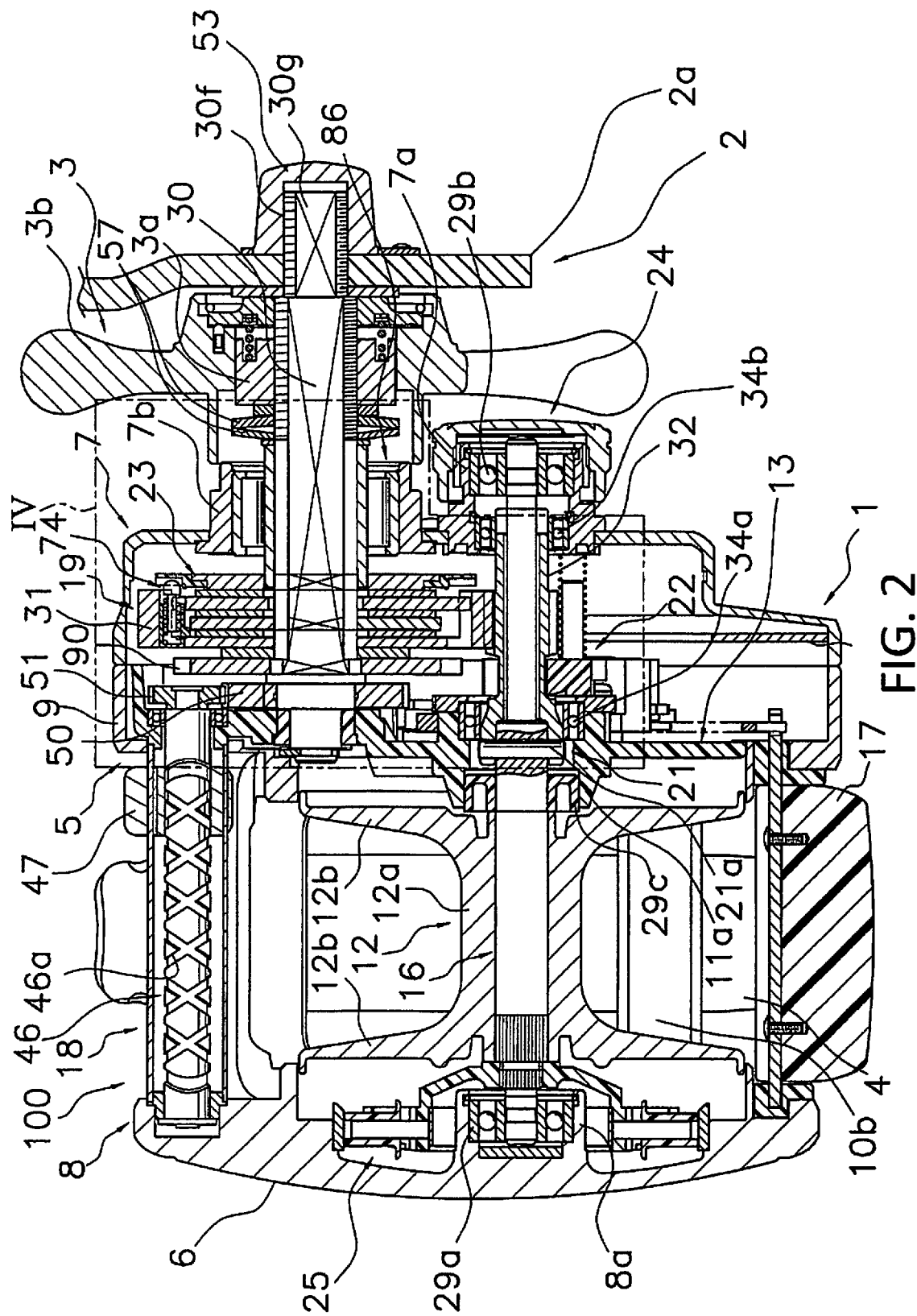
FIG. 2 is a cross-sectional view of the dual bearing reel.

In FIG. 1 and FIG. 2, the dual bearing reel 100 that employs one embodiment of the present invention comprises a reel body 1, a handle 2 for rotating the spool disposed on the reel body 1 side, a spool 12, and a drag device 23.
Schematic Structure of the Dual-Bearing Reel The reel body 1 comprises a frame 5, a first side cover 6 and a second side cover 7 that are mounted on respective sides of the frame 5, and a mechanism mounting plate 13. The frame 5 comprises a first side plate 8 and a second side plate 9 that are disposed so as to oppose each other with a prescribed gap therebetween and a front connecting portion 10a and a lower connecting portion 10b that couple the first side plate 8 and the second side plate 9. A rod mounting leg portion 4 for mounting a fishing rod thereto is integrally formed on the lower connecting portion 10b.

The first side cover 6 has a substantially circular shape when viewed from the outside in the spool shaft direction, and the second side cover 7 is formed of two eccentric outer circumferences having different outer diameters. As shown in FIG. 2, the first side cover 6 is integrally formed with the first side plate 8. The second side cover 7 is, for example, fixed to the second side plate 9 using three screws. The second side cover 7 comprises a first boss portion 7a for supporting a spool shaft 16 to be described later and a second boss portion 7b for supporting a drive shaft 30 to be described later. The first boss portion 7a is disposed above and behind the second boss portion 7b. The mechanism mounting plate 13 supports the drive shaft 30, to which the handle 2 is integrally and rotatably coupled, and the spool shaft 16. The mechanism mounting plate 13 is detachably mounted on the second side cover 7.

As shown in FIG. 1, the handle 2 comprises a handle arm 2a that is integrally and rotatably mounted on the drive shaft 30 (refer to FIG. 2) and a handle grip 2b that is rotatably mounted on the distal end of the handle arm 2a. The handle arm 2a is disposed axially outside of a star drag 3 to be described later.

As shown in FIG. 2, the spool 12, a clutch lever 17 that is against the thumb when thumbing, and a level winding mechanism 18 for uniformly winding the fishing line onto the spool 12 are disposed in the frame 5. A rotation transmission mechanism 19, a clutch mechanism 21, a clutch control mechanism 22, the drag device 23, and a casting control mechanism 24 are disposed between the frame 5 and the second side cover 7. Moreover, a centrifugal brake mechanism 25 for suppressing backlash when casting is disposed between the frame 5 and the first side cover 6.

The rotation transmission mechanism 19 transmits the rotational force from the handle 2 to the spool 12 and the level winding mechanism 18. The clutch mechanism 21 is disposed in the middle of the rotation transmission mechanism 19 and connects and disconnects the drive shaft 30 and the spool 12. The clutch control mechanism 22 controls the connecting and the disconnecting of the clutch mechanism 21 in accordance with an operation of the clutch lever 17. The casting control mechanism 24 adjusts the resistive force during rotation of the spool 12.

The spool 12 is integrally and rotatably coupled with the spool shaft 16 that extends through the center thereof. The spool 12 comprises a line-winding drum 12a around which the fishing line is wound and a pair of large diameter flange portions 12b that are integrally formed on respective sides of the line-winding drum 12a. The spool shaft 16 is rotatably supported by the reel body 1 using three axle bearings 29a, 29b, and 29c.

The clutch lever 17 is disposed behind the spool 12 in the rear portion between the first side plate 8 and the second side plate 9. The clutch lever 17 slides in the vertical direction between the first side plate 8 and the second side plate 9.

The level winding mechanism 18 is disposed between the first side plate 8 and the second side plate 9 in front of the spool 12. The level winding mechanism 18 comprises a screw shaft 46 in which a spiral groove 46a that intersects the outer perimeter surface is formed and a fishing line guide portion 47 that is reciprocated in the spool shaft direction by the screw shaft. The two ends of the screw shaft 46 are rotatably supported by the first side plate 8 and the second side plate 9.
Configuration of the Rotation Transmission Mechanism The rotation transmission mechanism 19 comprises, as shown in FIG. 2, the drive shaft 30, a drive gear 31 that is fixed to the drive shaft 30, a tubular pinion gear 32 that meshes with the drive gear 31, a first gear device 50 that is integrally and rotatably mounted on the proximal end portion of the drive shaft 30, and a second gear device 51 that is non-rotatably mounted on the right end of the screw shaft 46 in FIG. 2.

Figure 3:
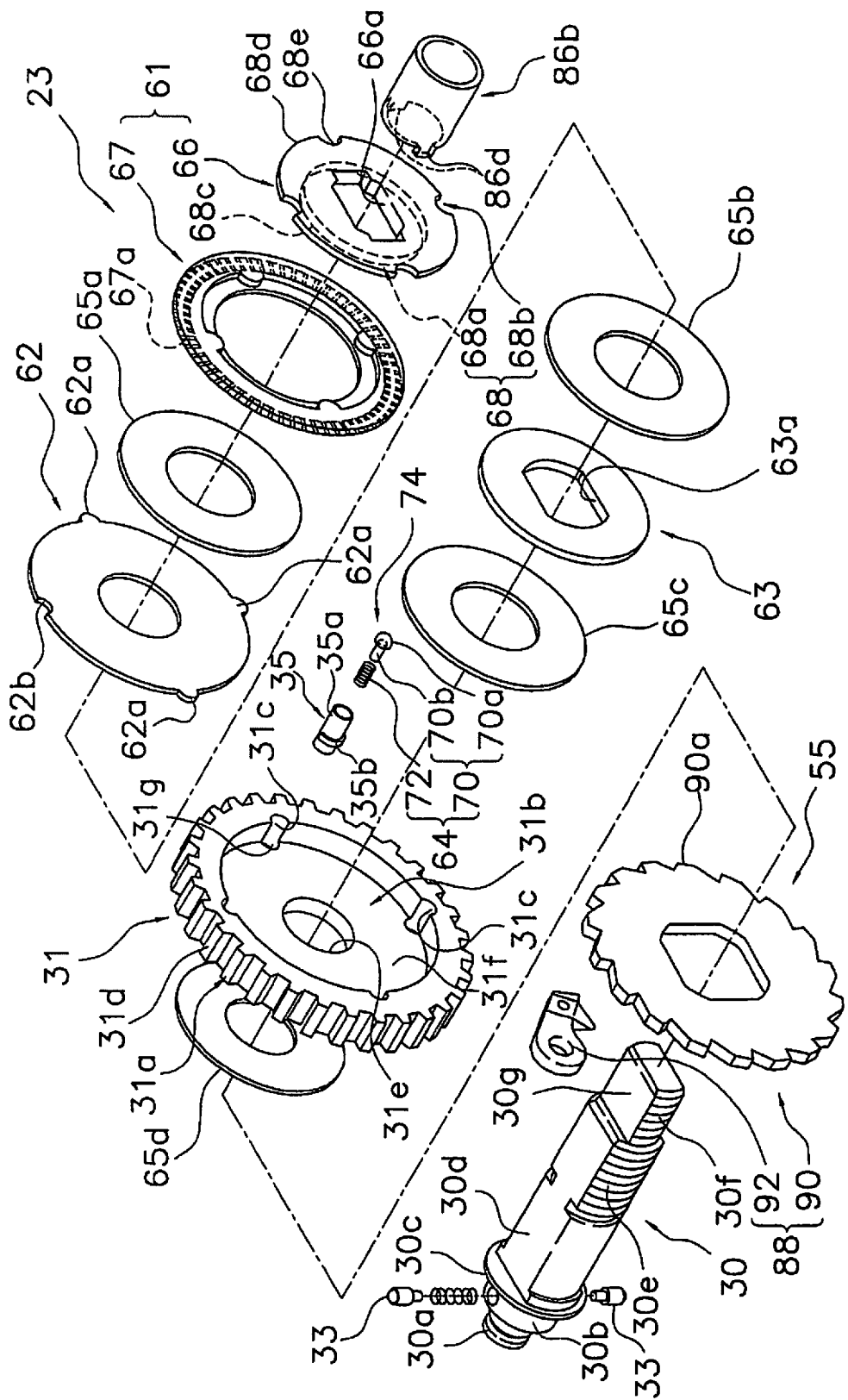
FIG. 3 is an exploded perspective view of the drag device.
Figure 4:
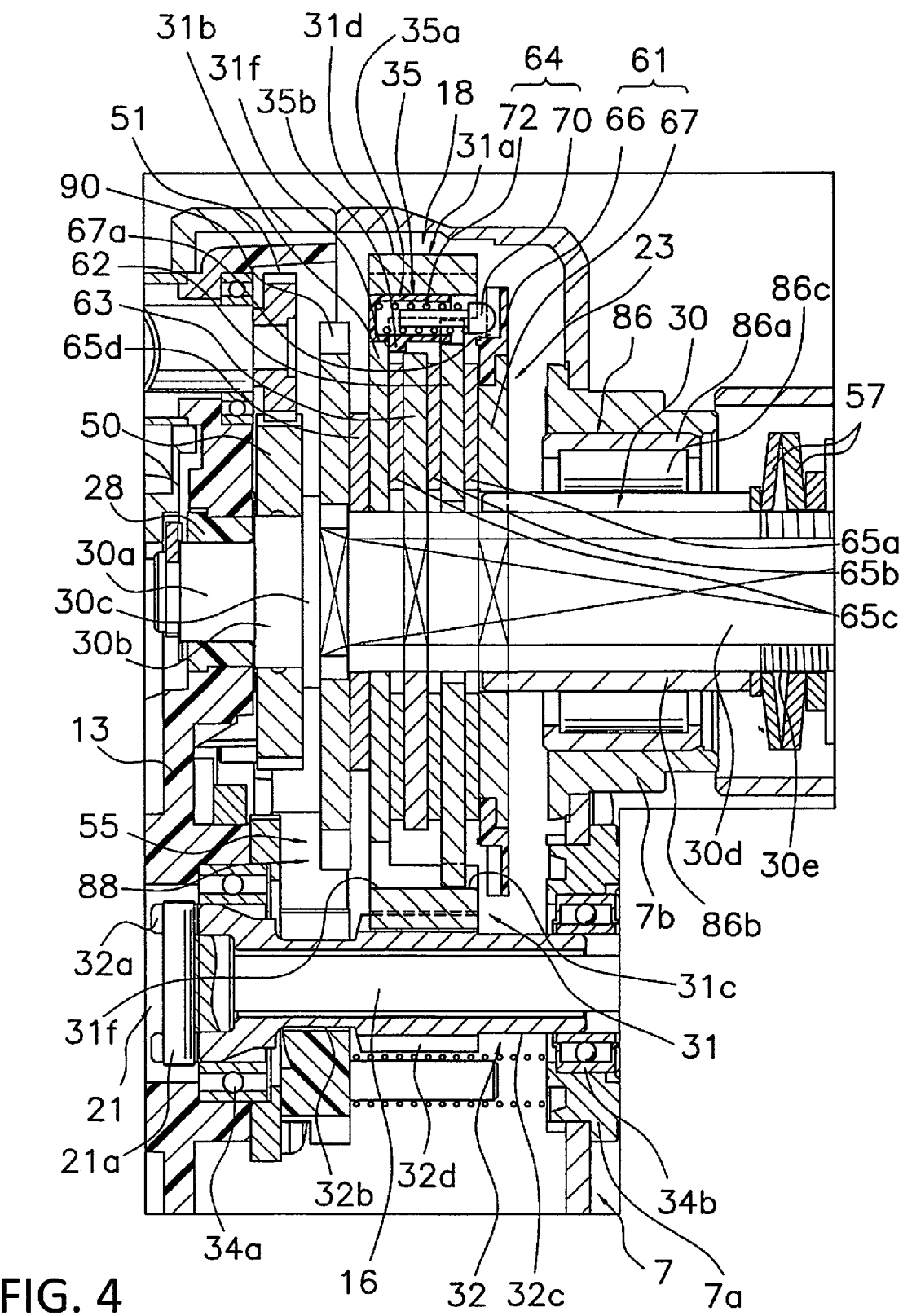
FIG. 4 is an enlarged sectional view of IV in FIG. 2.

As shown in FIG. 4, the drive shaft 30 is prevented from rotating in the casting (line-feeding) direction (reverse rotation) by a reverse rotation prevention mechanism 55. Accordingly, the drag device 23 is rendered operable. The reverse rotation prevention mechanism 55 comprises a roller type first one-way clutch 86 and a claw type second one-way clutch 88. The first one-way clutch 86 is disposed on the intermediate portion of the drive shaft 30 and is mounted in the gap between the drive shaft 30 and the second boss portion 7*b* of the second side cover 7 of the reel body 1. The first one-way clutch 86 is an inner ring idling type roller clutch. The first one-way clutch 86 comprises an outer ring 86*a* that is non-rotatably mounted on the second boss portion 7*b*, an inner ring 86*b* that is integrally and rotatably coupled with the drive shaft 30, and a roller 86*c* that is disposed between the outer ring 86*a* and the inner ring 86*b*. A pair of engagement projections 86*d* is disposed on the inner ring 86*b*, as shown in FIG. 3. The pair of engagement projections 86*d* is formed so as to protrude axially from the end surface of the inner ring 86*b* on the drive gear 31 side and is integrally and rotatably coupled with a drag plate 66 of a first drag device 61 to be described later. In this embodiment, the inner ring 86*b* is integrally and rotatably coupled with the drive shaft 30 via the drag plate 66.

The second one-way clutch 88 comprises, as shown in FIG. 3, a ratchet wheel 90 that has ratchet teeth 90*a* on the outer perimeter and a ratchet pawl 92 that is pivotally mounted on the outer side surface of the mechanism mounting plate 13 of the reel body 1. The ratchet wheel 90 is disposed on a first locking portion 30*d* of the drive shaft 30 contacting a flange portion 30*c* and is integrally rotatable with the drive shaft 30. Thus, when the ratchet pawl 92 catches the ratchet teeth 90*a*, the rotation of the drive shaft 30 in the casting direction is prevented. A drag disc 65*d* in the drag device 23 is disposed between the ratchet wheel 90 and the drive gear 31. The ratchet wheel 90 also functions as a drag device that is integrally rotatable with the drive shaft 30.

As shown in FIG. 4, the drive shaft 30 is rotatably supported by the second side cover 7 and the frame 5 by the axle bearing 28 and the first one-way clutch 86. As shown in FIG. 3 and FIG. 4, respectively formed on the drive shaft 30, from the proximal end side to the distal end side, are a supported portion 30*a*, a torque regulating portion 30*b*, a flange portion 30*c*, a first locking portion 30*d*, a first male thread portion 30*e*, a second male thread portion 30*f* (refer to FIG. 3), and a second locking portion 30*g* (refer to FIG. 3).

An axle bearing 28 for rotatably supporting the drive shaft 30 (refer to FIG. 4) is mounted on the supported portion 30*a*. The torque regulating portion 30*b* is larger in diameter than the supported portion 30*a*. The torque regulating portion 30*b* integrally and rotatably couples the first gear device 50 with the drive shaft 30 within the allowable torque range by a pair of regulating pins 33 that are biased radially outward. The flange portion 30*c* is larger in diameter than the torque regulating portion 30*b*. The flange portion 30*c* is disposed so as to receive the pressing force that is generated by the drag device 23. The first locking portion 30*d* is disposed to integrally and rotatably couple a first drag device 61, a second drag device 62, and a ratchet wheel 90 that form the drag device 23 (each to be described later) with the drive shaft 30. The first locking portion 30*d* is smaller in diameter than the flange portion 30*c* and is formed from two sets of chamfered portions that are parallel to each other. The first male threaded portion 30*e* is provided so as to screw the star drag 3 of the drag device 23. The first male threaded portion 30*e* is formed on the outer perimeter surface on the distal end side of the first locking portion 30*d*, excluding the first locking portion 30*d*. The second male threaded portion 30*f* is formed on the distal end portion of the drive shaft 30 so as to have a smaller diameter than the first male threaded portion 30*e*. The second locking portion 30*g* is smaller in diameter than the first locking portion 30*d* and is formed of one set of chamfering portions that are parallel to each other. The second locking portion 30*g* is formed on the outer perimeter surface of the drive shaft 30 where the second male threaded portion 30*f* is formed. The second locking portion 30*g* is provided so as to integrally and rotatably couple with the handle 2. The handle 2 is fixed to the drive shaft 30 so as to be integrally rotatable using a nut 53 (refer to FIG. 2) that is screwed onto the second male threaded portion 30*f*.

The drive gear 31 is rotatably mounted on the drive shaft 30 and is coupled with the drive shaft 30 via the drag device 23. The drive gear 31 comprises a tubular gear portion 31*a*, a disc portion 31*b* that has a thinner wall than the gear portion 31*a*, and at least one first engagement recess 31*c* that is formed on the inner perimeter surface of the gear portion 31*a*. In this embodiment, a plurality (for example, two to six-four in this embodiment) of the first engagement recesses 31*c* is formed so as to be recessed in a circular arc shape on the inner perimeter portion of the gear portion 31*a*. The gear portion 31*a* comprises gear teeth 31*d* that are formed on the outer perimeter side of the drive gear 31. The disc portion 31*b* is integrally formed on the inner perimeter side of the gear portion 31*a* and is rotatably mounted on the drive shaft 30. The disc portion 31*b* is thinner walled than the gear portion 31*a*. A supporting hole 31*e* that is supported on the drive shaft 30 is formed in the center of the disc part 31*b*. Furthermore, the disc portion 31*b* comprises a pressed side surface 31*f* that is pressed by the drag device 23 on the handle 2 side. The first engagement recess 31*c* integrally and rotatably couples the second drag device 62 with the drive gear 31. The first engagement recess 31*c* is formed so as to extend through to the surface away from the second side cover 7 of the drive gear 31, and a circular mounting hole 31*g* is formed in the penetration portion.

The drive gear 31 further comprises a housing part 35 in which is housed a sound unit 64 of the drag device 23 to be described later. The housing part 35 comprises a bottomed tubular housing part body 35*a* and a positioning protrusion 35*b* that protrudes in a circular arc shape on the outer perimeter surface of the housing part body 35*a*. The housing part body 35*a* can be engaged with the mounting hole 31*g* and the first engagement recess 31*c* and is movable in the axial direction. A sound unit 64 is housed in the housing part body 35*a*. When the housing part body 35*a* is mounted in the mounting hole 31*g*, the back surface of the positioning protrusion 35*b* that is axially disposed (the surface away from the handle 2) contacts the wall surface of the disc portion 31*b* on the periphery of the mounting hole 31*g*, and both surfaces in the circumferential direction contact the inner perimeter surface of the gear portion 31*a*. As a result, the housing part body 35*a* is axially positioned and prevented from rotating. Meanwhile, the housing part 35 can be mounted on any of the four mounting holes 31*g*.

The pinion gear 32 is, as shown in FIG. 2, a tubular device that extends from outside of the second side plate 9 inward, and the spool shaft 16 extends through the center thereof. The pinion gear 32 is supported by the reel body 1 so as to be rotatable as well as movable in the axial direction by the axle bearing 34*a* and axle bearing 34*b*. The axle bearing 34*a* is mounted on the mechanism mounting plate 13. The axle bearing 34*b* is mounted on the first boss portion 7*a* of the second side cover 7. As shown in FIG. 4, at the left end portion of the pinion gear 32 in FIG. 4 a meshing groove 32*a* is formed that meshes with an engagement pin 21*a* of the clutch mechanism 21 to be described later. The clutch mechanism 21 is formed by this meshing groove 32a and the engagement pin 21a that is mounted on the spool shaft 16. Moreover, a constricted portion 32b is formed on the intermediate portion, and a support portion 32c that is supported on the axle bearing 34b is formed at the right end portion of the pinion gear 32. A gear portion 32d that meshes with the drive gear 31 is formed between the constricted portion 32b and the support portion 32c.

The first gear device 50 is, as described above, mounted on the torque regulating portion 30b of the drive shaft 30. The first gear device 50 runs idle when, for some reason, the screw shaft 46 or the second gear device 51 becomes non-rotatable and torque exceeding the allowable torque acts on the first gear device 50. The first gear device 50 abuts the flange portion 30c from the proximal end portion side of the drive shaft 30. The second gear device 51 that is mounted on the screw shaft 46 meshes with the first gear device 50. Given such a configuration, the screw shaft 46 of the level winding mechanism 18 rotates in conjunction with the rotation of the drive shaft 30 in the line-winding direction.
Configuration of the Drag Device The drag device 23 regulates the relative rotation between the drive gear 31 that is interlocked with the spool 12 and the drive shaft 30 until a prescribed torque amount is exceeded. Additionally, the drag device 23 brakes the rotation of the spool 12 in the casting direction when the drive gear 31 and the drive shaft 30 rotate relatively in excess of the prescribed torque amount. The drag device 23 mainly comprises a star drag 3 as shown in FIG. 2, a first drag device 61 as shown in FIG. 3 and FIG. 4, a second drag device 62, a third drag device 63, a sound unit 64, and a plurality of (for example 4) drag discs 65a to 65d. The first drag device 61 is one example of a drag device of the present invention.

As shown in FIG. 2, the star drag 3 comprises a nut 3a that is screwed onto the first male threaded portion 30e of the drive shaft 30 and a body device 3b that supports the nut 3a integrally and rotatably as well as movably in the axial direction. The star drag 3 is one example of a drag adjustment device. The star drag 3 presses a device mounted on the drive shaft 30 further onto the proximal end side than the star drag 3 (for example, a device such as the inner ring 86b of the first one-way clutch 86, the first drag device 61, the second drag device 62, or the third drag device 63) to adjust the prescribed torque amount. A plurality of (for example two to six-two in this embodiment) disc springs 57 are mounted between the star drag 3 and the first one-way clutch 86. The disc spring 57 can gently transmit the clamping force of the star drag 3 to the first drag device 61. The disc spring 57 contacts the star drag 3 and the inner ring 86b of the first one-way clutch 86, respectively, via a washer.

By adjusting the tightness thereof, the star drag 3 can move the inner ring 86b of the first one-way clutch 86 that is mounted on the second side cover 7 in the axial direction via the disc spring 57. That is, the pressing force of the disc spring 57 is adjusted by adjusting the star drag 3. Accordingly, the drag force of the drag device 23 can be finely adjusted using the star drag 3.

The first drag device 61, as shown in FIG. 3 and FIG. 4, is integrally rotatable with the drive shaft 30 and is pressed against the drive gear 31 by the inner ring 86b of the first one-way clutch 86. The first drag device 61 comprises a sound-generating portion 67a that is formed on the pressure side surface with respect to the drive gear 31. The first drag device 61 is integrally and rotatably mounted on the drive shaft 30. The first drag device 61 comprises a drag plate 66 that can press the drive gear 31 and a sound-generating ring 67 that includes a sound-generating portion 67a.

The sound-generating ring 67 having the sound-generating portion 67a is one example of a device for a fishing reel of the present invention and is also an example of a sound generating device of a sound-generating mechanism.

The drag plate 66 is integrally and rotatably mounted on the first locking portion 30d of the drive shaft 30. The sound-generating ring 67 is mounted on the outer perimeter side of the drag plate 66 so as to be integrally rotatable with the drag plate 66.

Figure 5:
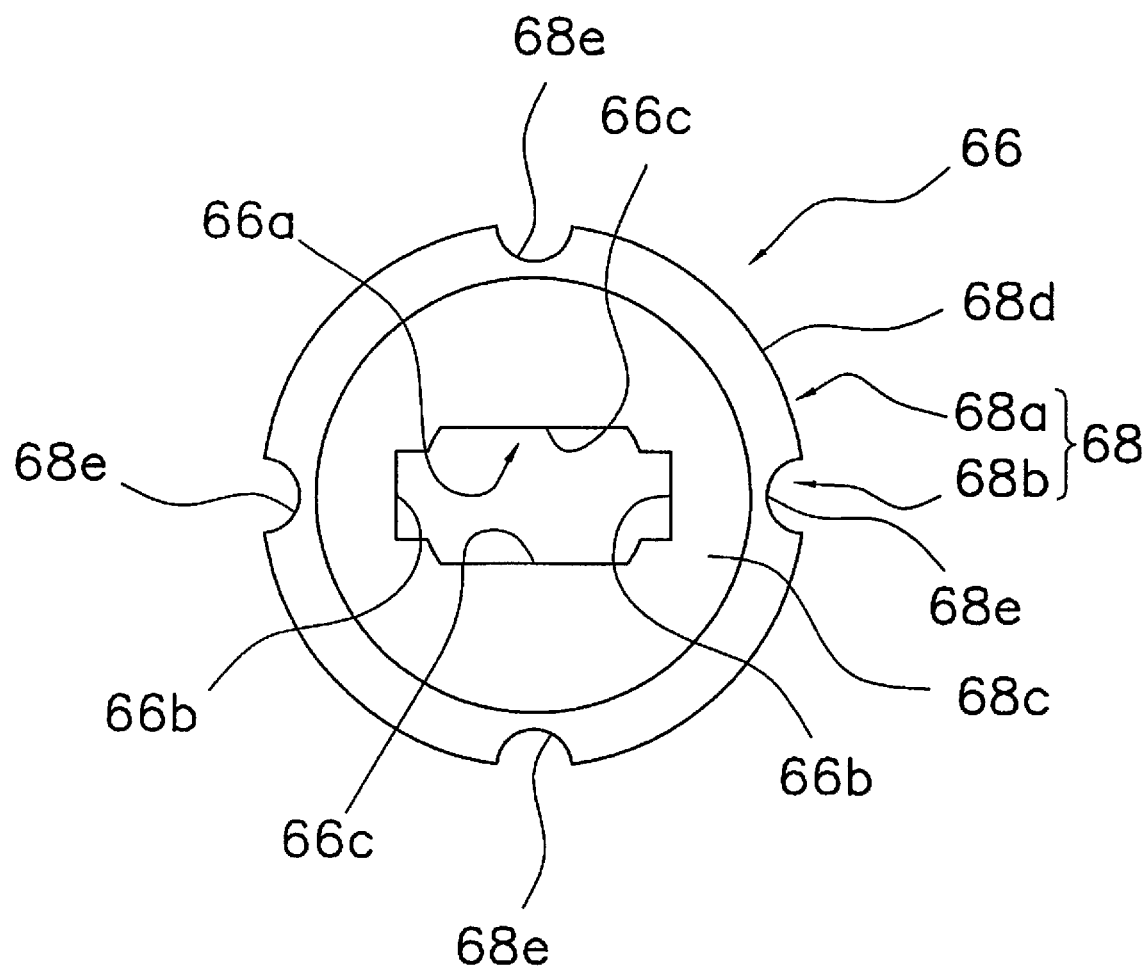
FIG. 5 is a frontal view of the first drag device seen from the drive gear side.
Figure 6:
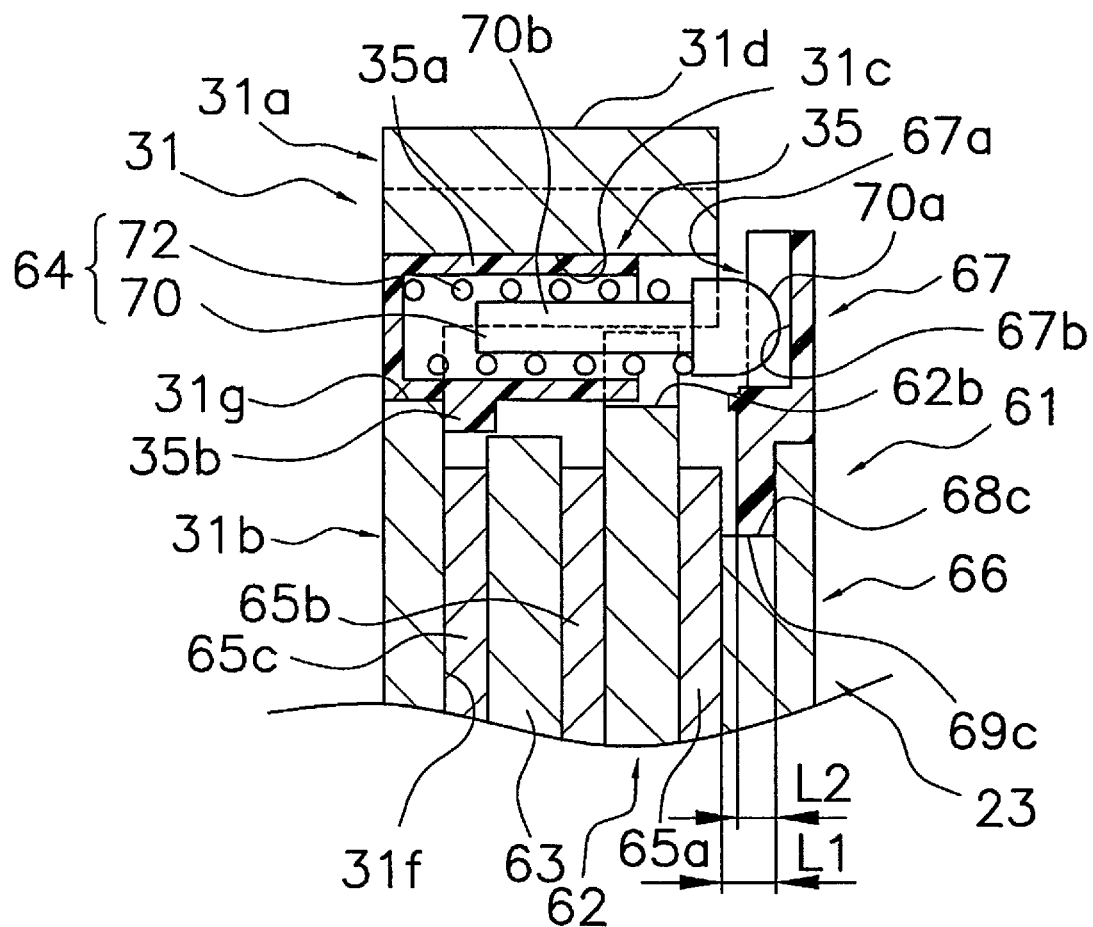
FIG. 6 is a cross-sectional view of the drive gear and the striking pin mounting portion of the sound-generating ring

As shown in FIG. 3 and FIG. 5, the drag plate 66 is a disc-shaped device. The drag plate 66 comprises an engagement portion 68 that is formed on the outer perimeter portion and that engages with the sound-generating ring 67 and a non-circular hole 66a that is formed in the inner perimeter portion. The non-circular hole 66a is integrally and rotatably engaged with the first locking portion 30d of the drive shaft 30 as well as with the pair of engagement projections 86d of the inner ring 86b of the first one-way clutch 86. The non-circular hole 66a comprises a pair of rectangular recesses 66b that engage with the pair of engagement projections 86d of the inner ring 86b and a pair of straight portions 66c that engage with the first locking portion 30d of the drive shaft 30.

The engagement portion 68 comprises a first engagement portion 68a that engages the sound-generating ring 67 in the pressing direction in which the drive gear 31 is pressed (the left direction of the drive shaft in FIG. 3) and a second engagement portion 68b that engages the sound-generating ring 67 in the circumferential direction. The first engagement portion 68a comprises a pressing portion 68c that protrudes in the pressing direction and a flange portion 68d that extends radially from the outer perimeter side of the pressing portion 68c. The second engagement portion 68b comprises at least one second engagement recess 68e that is disposed at an interval in the circumferential direction of the flange portion 68d of the drag plate 66. The second engagement recess 68e is one example of an engagement recess of the second engagement.

The sound-generating ring 67 is a material device that mainly contains polyarylene sulfide resin (component A) as a base component, and glass fibers (component B) which contains 10 to 300 parts by weight of the component B based on 100 parts by weight of the component A, aramid fibers (component C) which contains 100 parts by weight of the component C based on 100 parts by weight of the component A, and fluororesin (component D) which contains 5-100 parts by weight of the component D based on 100 parts by weight of the component A.

Figure 7:
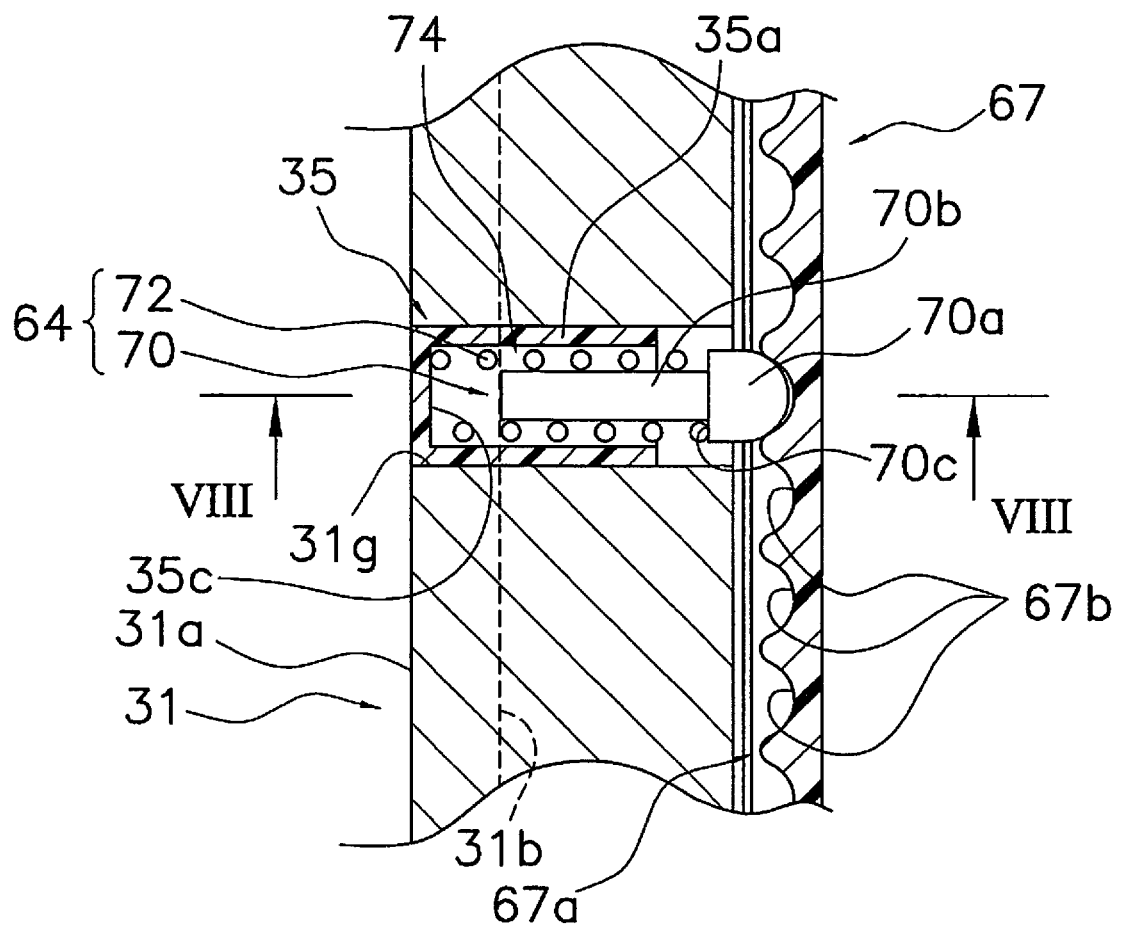
FIG. 7 is a cross-sectional view of the drive gear and the striking pin mounting portion of the sound-generating ring.

As shown in FIG. 3, FIG. 6, FIG. 7, and FIG. 8, the sound-generating ring 67 comprises an engaged portion 69 that engages with the engagement portion 68 of the drag plate 66 and a sound-generating portion 67a on a surface that can oppose the drive gear 31. The sound-generating portion 67a comprises a plurality of sound-emitting recesses 67b that are formed at intervals in the circumferential direction. The sound-emitting recess 67b is one example of an impacted portion. In this embodiment, the sound-emitting recesses 67b are formed at equal intervals, recessed in a wave shape, as shown in FIG. 7.

A prescribed gap is disposed between the engaged portion 69 and the engagement portion 68. The engaged portion 69 comprises a first engaged portion 69a that engages the first engagement portion 68a and a second engaged portion 69b that engages the second engagement portion 68b. The first engaged portion 69a comprises a through-hole 69c into which the pressing portion 68c can be inserted and that is smaller in diameter than the flange portion 68d. The second engaged portion 69b comprises a second engagement protrusion 69d that engages with the second engagement recess 68e of the drag plate 66. The second engagement protrusion 69d is one example of an engagement protrusion of the second engaged portion.

Figure 8:
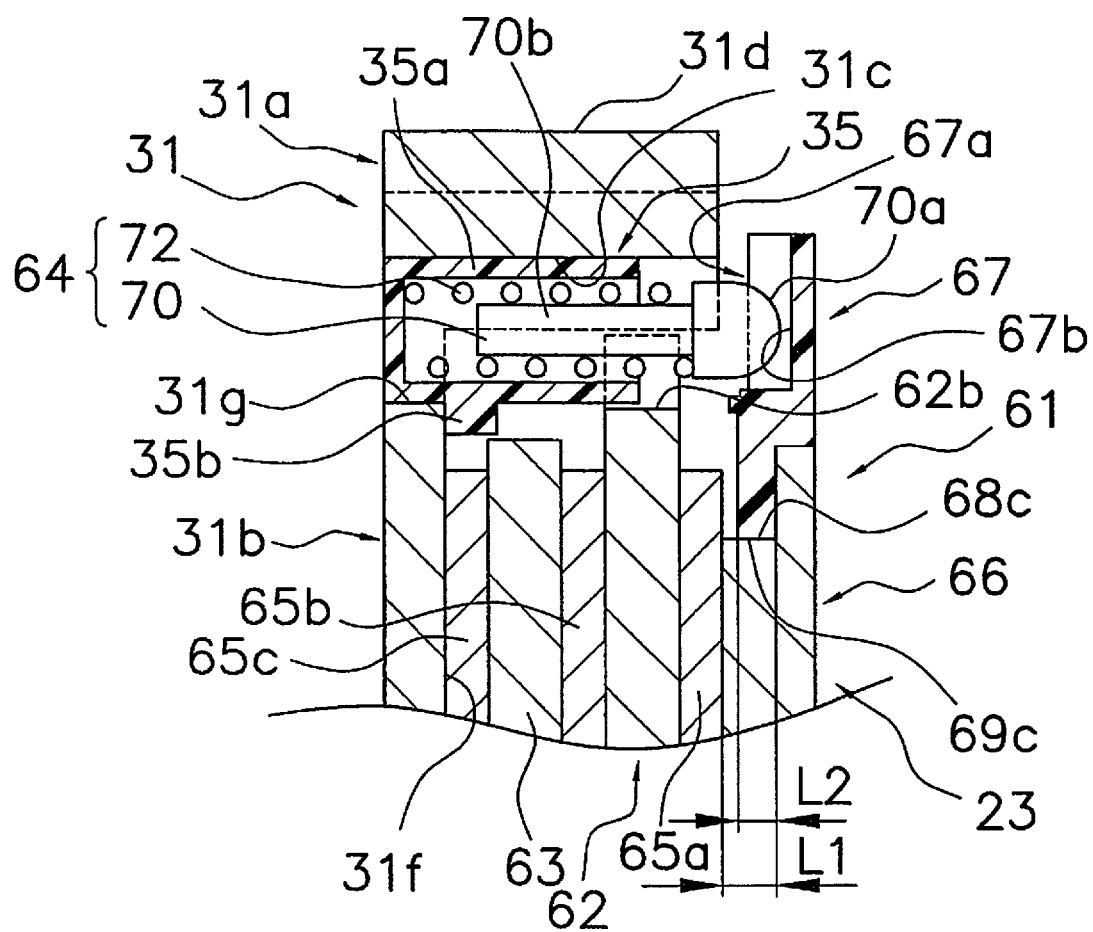
FIG. 8 is a cross-sectional view taken along the section line VIII-VIII of FIG. 7.

As shown in FIG. 8, the length L1 of the pressing portion 68c in the pressing direction is longer than the length L2 of the through-hole 69c in the pressing direction. Specifically, the length L1 of the pressing portion 68c is at least 0.1 mm longer than the length L2 of the through-hole 69c. Meanwhile, in FIG. 8, the length L2 of the through-hole 69c is drawn shorter than the actual length to make the gap easily recognizable. The sound-generating ring 67 is thereby movable in the axial direction with respect to the drag plate 66 by an amount corresponding to the gap between the two, which is the difference between the lengths L1-L2.

Figure 9:
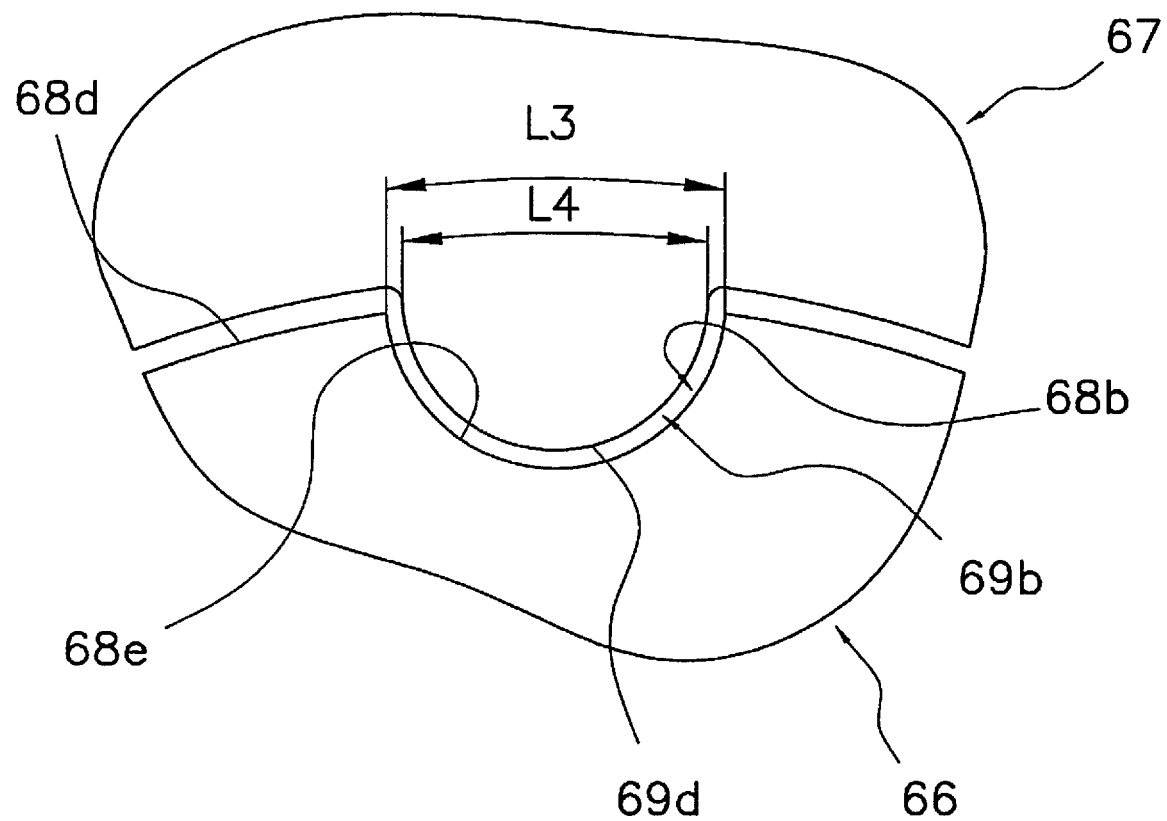
FIG. 9 is a schematic diagram showing the length of the first engagement recess of the drag plate in the circumferential direction and the length of the first engagement protrusion of the sound-generating ring in the circumferential direction.

As shown in FIG. 9, the length L4 of the sound-generating ring 67 in the circumferential direction of the second engagement protrusion 69d is shorter than the length L3 of the drag plate 66 in the circumferential direction of the second engagement recess 68e. Specifically, the length L4 of the engagement protrusion 69d in the circumferential direction is at least 0.1 mm shorter than the length L3 of the second engagement recess 68e in the circumferential direction. Meanwhile, in FIG. 9, the length L4 of the second engagement protrusion 69d is drawn shorter than the actual length to make the gap easily recognizable. The sound-generating ring 67 is thereby movable in the circumferential direction with respect to the drag plate 66 by an amount corresponding to the gap between the two in the circumferential direction, which is the difference between the lengths L3-L4.

As shown in FIG. 3 and FIG. 4, the second drag device 62 is disposed between the first drag device 61 and the third drag device 63. The second drag device 62 is disposed on the inner perimeter side of the gear portion 31a of the drive gear 31 and is integrally and rotatably provided with the drive gear 31. The second drag device 62 is pressed by the pressing portion 68c of the drag plate 66 of the first drag device 61 via the drag disc 65a. The second drag device 62 comprises at least one first engagement protrusion 62a that engages the plurality of first engagement recesses 31c of the drive gear 31 on the outer perimeter portion. The number of first engagement protrusions 62a is preferably smaller than the number of first engagement recesses 31c. In this embodiment, the number of first engagement recesses 31c is four and the number of first engagement protrusions 62a is three. Moreover, the second drag device 62 comprises a passage recess 62b, on the outer perimeter portion, through which the sound unit 64 can pass. In a state in which the first engagement protrusions 62a are engaged with the first engagement recesses 31c, the passage recess 62b is disposed in a position that can oppose the remaining first engagement recess 31c. Therefore, in the event the first engagement recesses 31c are disposed at equal intervals, a plurality of first engagement protrusions 62a and at least one passage recess 62b are disposed at equal intervals. The passage recess 62b is formed recessed such that the sound unit 64 that is housed in the housing part 35 can pass through.

The third drag device 63 is disposed between the second drag device 62 and the drive gear 31. The third drag device 63 is pressed by the second drag device 62 via a drag washer 65b. The third drag device 63 is disposed on the inner perimeter side of the gear portion 31a of the drive gear 31 and comprises a non-circular hole 63a that is integrally and rotatably engaged with the first locking portion 30d of the drive shaft 30 on the inner perimeter side, via the drag disc 65. The third drag device 63 presses the disc portion 31b of the drive gear 31 via the drag disc 65c.

The sound unit 64 is one example of a sound unit of the present invention and, as shown in FIG. 7 and FIG. 8, comprises a striking pin 70 and a biasing device 72 that biases the striking pin 70. The striking pin 70 is mounted on the housing part 35 that is mounted on the pressed side surface 31f that is pressed by the drag device 23 of the drive gear 31, so as to be freely movable back and forth with respect to the sound-generating portion 67a of the first drag device 61. The biasing device 72 elastically biases the striking pin toward the sound-generating portion 67a.

The striking pin 70 is a metallic device and can repeatedly strike the sound-generating portion 67a. The striking pin 70 comprises a head portion 70a at the distal end having a large diameter and a shaft portion 70b integrally formed on the proximal end of the head portion 70a. The head portion 70a is formed in a bullet shape, and the distal end portion is, for example, rounded so as to be spherical. The size of the head portion 70a is formed so as to be capable of engaging the sound-emitting recess 67b. Specifically, the size of the head portion 70a is such that it can enter into the sound-emitting recess 67b. The head portion 70a is disposed so as to protrude from the housing part 35. The shaft portion 70b is smaller in diameter than the head portion 70a and can engage the biasing device 72.

The biasing device 72 is a coil spring that is disposed on the outer perimeter side of the shaft portion 70b of the striking pin 70. The biasing device 72 is disposed in a compressed state between the bottom surface 35c of the housing part 35 and the level difference 70c between the head portion 70a and the shaft portion 70b of the striking pin 70.

The sound-generating mechanism 74 is formed from the sound unit 64 and the sound-generating portion 67a. The striking pin 70 that is biased toward the sound-generating portion 67a by the biasing device 72 biases the first drag device 61 toward the handle 2 side in an assembled state.

The drag disc 65a to drag disc 65d, for example, can be formed of materials such as felt, carbon, etc.

In this type of configuration, the striking pin 70 rotates in conjunction with the drive gear 31, and the drive shaft 30 and the first drag device 61 are prohibited from reverse rotation by a reverse rotation prevention mechanism 55. Therefore, when the drive shaft 30 and the drive gear 31 rotate relatively by operation of the drag device 23, the striking pin 70 repeatedly strikes the sound-generating portion 67a of the first drag device 61 and generates sound. At this time, because sound is generated in a position close to the second side cover 7 on which is disposed the sound-generating ring 67, when the drag device 23 is operated, it is possible to generate a loud, clear sound.

Next, the operation of this dual bearing reel will be explained.

When winding the fishing line, the handle 2 is turned in the reeling (line-winding) direction. The rotation of the handle 2 is transmitted from the drive shaft 30 to the drive gear 31 that is interlocked with the drive shaft 30 and the pinion gear 32 via the drag device 23. The rotation of the pinion gear 32 is transmitted to the spool shaft 16 that is fitted with the pinion gear 32 by the clutch mechanism 21, and the spool 12 rotates and winds up the fishing line. This rotation of the drive shaft 30 is also transmitted to the screw shaft 46 via the first gear device 50 and the second gear device 51. With the rotation of the screw shaft 46, the fishing line guide portion 47 of the level winding mechanism 18 reciprocates along the spool shaft 16. With this reciprocating motion, the fishing line is substantially uniformly wound onto the spool 12.

On the other hand, when casting or unreeling the fishing line, the clutch lever 17 is operated and the clutch mechanism 21 is put in a detached state (clutch off state) by the clutch control mechanism 22. The engagement between the spool shaft 16 and the pinion gear 32 is thereby released, and even if the spool 12 is rotated due to casting of the fishing line, the rotation is not transmitted to the rotation transmission mechanism 19 and the drive shaft 30.

Next, the operation of the drag device 23 will be explained.

When landing a fish, tension is applied to the fishing line. Consequently, torque, tending toward rotation in the casting direction, acts on the spool 12. However, because the drive gear 31 is pressed toward the ratchet wheel 90 side by the disc spring 57 that is compressed by the tightening of the star drag 3, as long as the torque that acts on the spool 12 is low, the drive gear 31 and the drive shaft 30 are relatively non-rotatable. And, because the drive shaft 30 is stopped by the reverse rotation prevention mechanism 55 so as to not rotate in the casting direction, the spool 12 that is interlocked with the drive gear 31 will also not rotate in the casting direction.

When the tension on the fishing line increases and the torque applied to the spool 12 becomes high, the drive gear 31 and the second drag device 62 will be rotated in the casting direction while slipping with respect to the first drag device 61, the third drag device 63, and the ratchet wheel 90. The spool 12 will thereby also rotate in the casting direction. Accordingly, when the torque acting on the spool 12 exceeds a prescribed value, in other words, when excessive tensile force is applied to the fishing line, the drag device 23 is activated and the spool 12 rotates in the casting direction to protect the fishing line from the excessive tensile force.

When the spool 12 rotates in the casting direction when landing a fish, as described above, a sound is generated by the sound-generating mechanism 74. When the drive shaft 30 and the drive gear 31 rotate relative to each other, the sound-emitting recess 67b of the first drag device 61 that rotates in conjunction with the drive shaft 30 and the striking pin 70 that rotates in conjunction with the drive gear 31 will interfere with each other and generate a clicking sound. This clicking sound is generated by the head portion 70a of the striking pin 70, which is biased toward the sound-emitting recesses 67b that are disposed at equal intervals, abutting intermittently. For this reason, the clicking sound is a rhythmic sound. When this sound is generated, because the first drag device 61 with the sound-generating portion 67a is disposed in a position near the second side cover 7 and generates a sound in a position near the outer side of the dual bearing reel 100, a loud sound can be clearly generated. Moreover, because, in the first drag device 61, the drag plate 66 and the sound-generating ring 67 are disposed at intervals in the circumferential direction and the axial direction, the sound-generating ring 67 is more prone to vibration, and an even louder can be generated.

In this manner, when the spool 12 rotates in the casting direction when landing a fish, a clear sound is generated, so the angler can recognize the rotation of the spool, which is convenient for the angler. Furthermore, because the sound-generating ring 67 is not pressed even if the drag device 23 is activated, the generated sound will resonate well and the volume will be high.

Meanwhile, the adjustment of the magnitude of the torque for rotating the spool 12, that is, the drag force, is carried out by changing the degree of pressure of the drive gear 31 by adjusting the pressing force of the disc spring 57 using the tightness of the star drag 3.

Alternate Embodiment

An alternate embodiment will be described using FIG. 10 and FIG. 11. Only the differences from the above-described embodiment are described, and the descriptions of other identical portions are omitted.

In the above-described embodiment, the sound-generating ring 74 is mounted on the outer perimeter side of the drag plate 66, which is integrally and rotatably mounted on the first locking portion 30d of the drive shaft 30, so as to be integrally rotatable with the drag plate 66. In addition, the sound unit 64 is mounted on the housing part 35 that is mounted on the pressed side surface 31f that is pressed by the drag device 23 of the drive gear 31, so as to be freely movable back and forth with respect to the sound-generating portion 67a of the first drag device 61.

Figure 10:
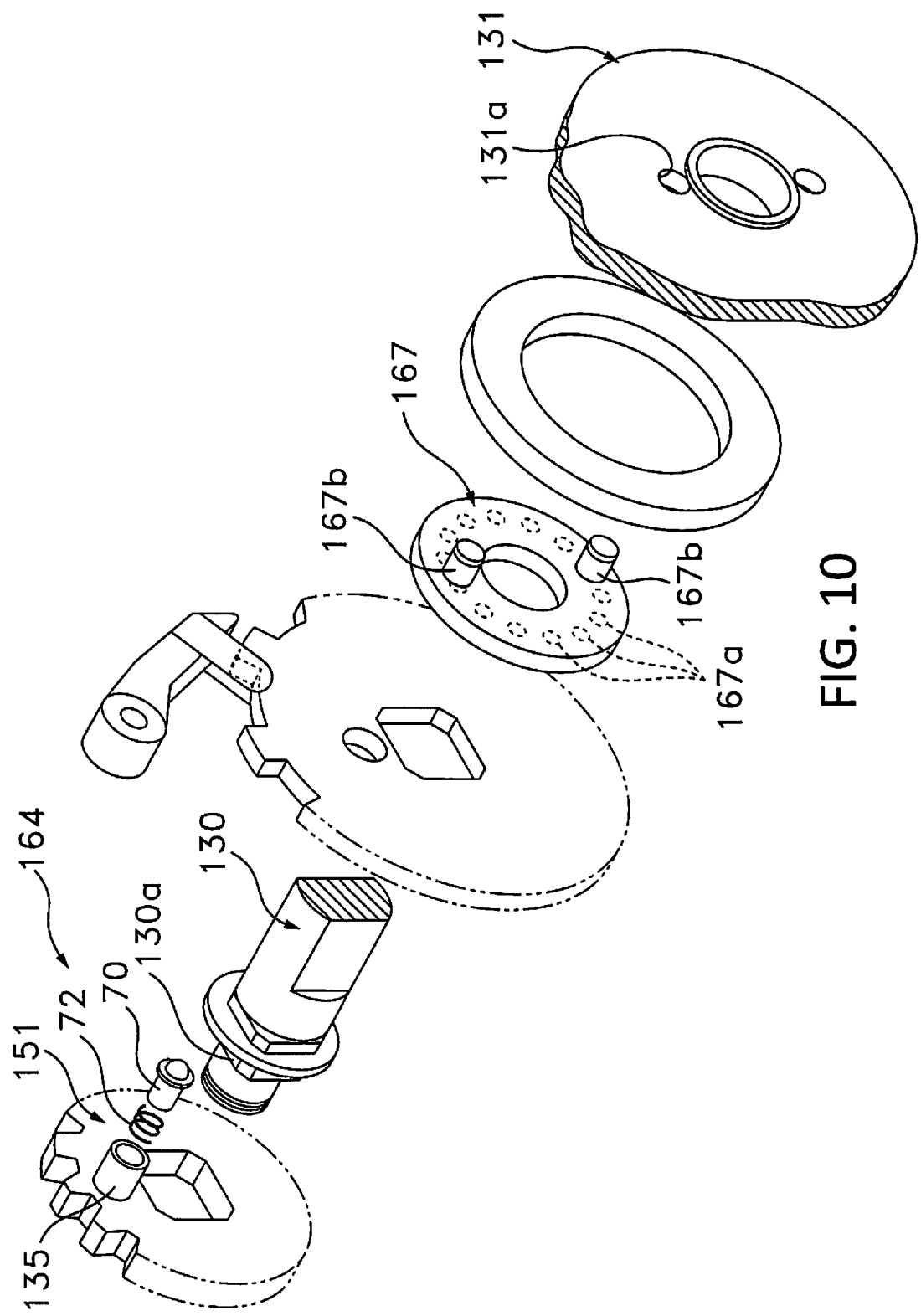
FIG. 10 is a diagram of an alternative embodiment, corresponding to FIG. 3.
Figure 11:
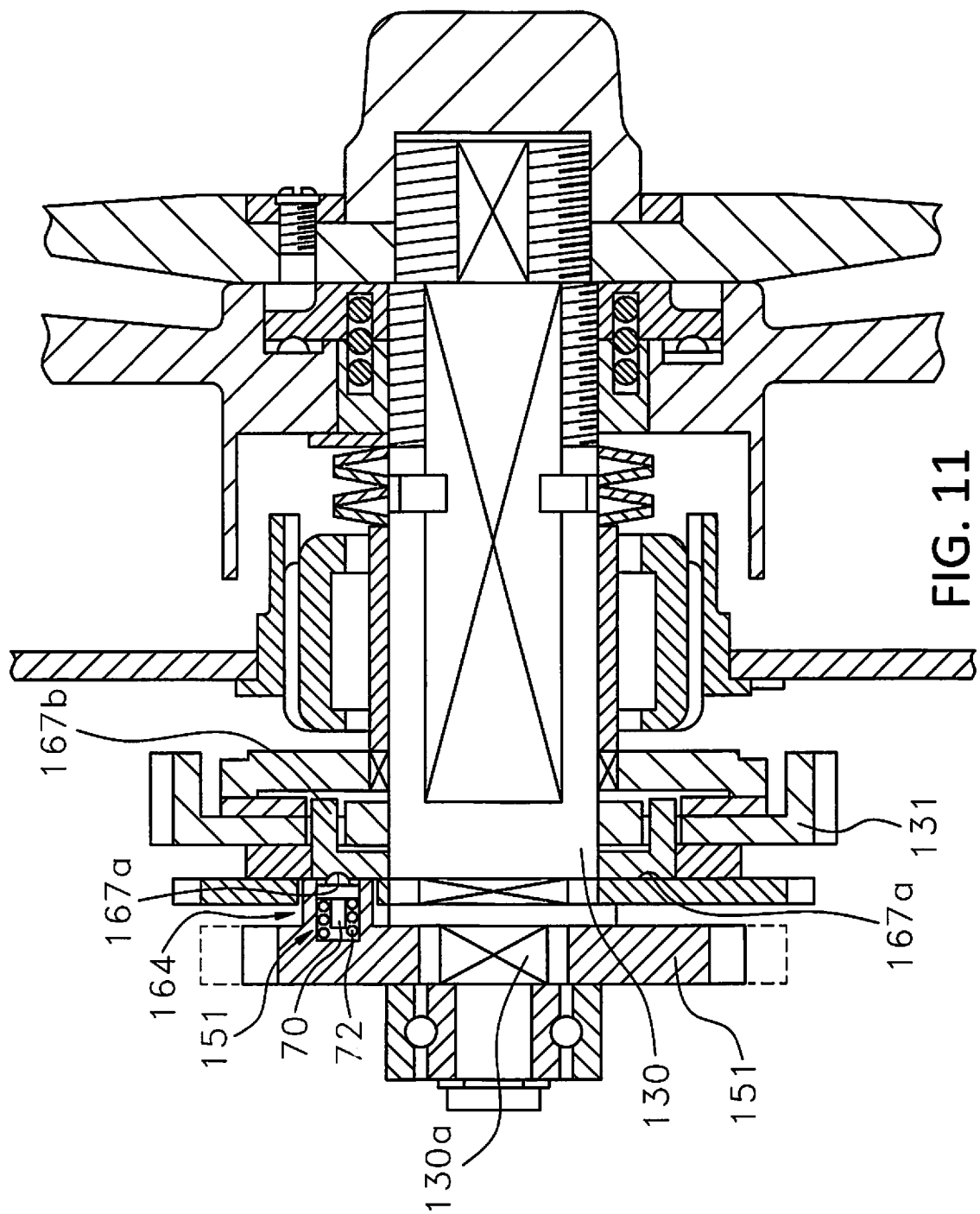
FIG. 11 is a diagram of an alternative embodiment, corresponding to FIG. 4.
Figure 12:
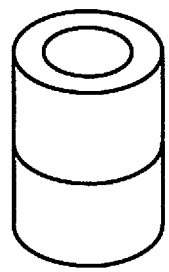
FIG. 12 is a schematic view of a hollow cylindrical test piece used for evaluating sound.

That is, the sound-generating mechanism 74 is configured from a sound-generating ring 67 that can be integrally rotated with the drive shaft 30 and that serves as a sound generating device that has a sound-generating portion 67a and a sound unit 64 that can be integrally rotated with the drive gear 31 and that interferes with the sound-generating portion 67a by relative rotation between the drive gear 31 and the drive shaft 30 to generate sound; however, as shown in FIG. 10 and FIG. 11, in an alternative embodiment, it is also possible to configure a sound-generating mechanism 174 to have, for example, a sound-generating ring 167 that engages with and can be integrally rotated with a drive gear 131 and that has sound-emitting recesses 167a and a sound unit 164 that is disposed on a gear device 151 that engages with and can be integrally rotated with an engagement portion 131a of a drive shaft 130 and that interferes with a sound-generating portion 167a by relative rotation between the drive gear 131 and the drive shaft 130 to generate sound.

The components of the sound-generating rings 67, 167, which are used as embodiments of the device for a fishing reel of the present invention, will be described in detail below.

Component A: Polyarylene Sulfide Resin as a Base Component

Any polyarylene sulfide resin belonging to a category referred to as polyarylene sulfide resins, particularly polyphenylene sulfide resin, may be used as component A of the present invention.

Examples of polyarylene sulfide resin include those having, as structural units thereof, for example, a p-phenylene sulfide unit, an m-phenylene sulfide unit, an o-phenylene sulfide unit, a phenylene sulfide sulfone unit, a phenylene sulfide ketone unit, a phenylene sulfide ether unit, a diphenylene sulfide unit, a substituent group-containing phenylene sulfide unit, a branched structure-containing phenylene sulfide unit, and the like, of which those containing 70 mol % or more, particularly those containing 90 mol % or more of p-phenylene sulfide, and poly (p-phenylene sulfide) is even more preferable.

The total chlorine content of the polyarylene sulfide resin to be used as component A of the present invention is preferably 500 ppm or less, more preferably 450 ppm or less, even more preferably 300 ppm or less, and most preferably 50 ppm or less. If the total chlorine content exceeds 500 ppm, there are cases in which the amount of gas generated increases and the weld strength decreases.

The total sodium content of the polyarylene sulfide resin to be used as component A of the present invention is preferably 39 ppm or less, more preferably 30 ppm or less, even more preferably 10 ppm or less, and most preferably 8 ppm or less. Above 39 ppm, not only does the weld strength decrease due to an increase in gas generated, but there are also cases in which, in a high temperature, high humidity environment, the wet heat resistance decreases due to an increase in the water absorption amount of the resin due to coordinate bonds between the sodium metal and water molecules.

The dispersion degree (Mw/Mn) represented by the weight-average molecular weight (Mw) and the number-average molecular weight (Mn) of the polyarylene sulfide resin to be used as component A of the present invention is preferably 2.7 or more, more preferably 2.8 or more, and even more preferably 2.9 or more. If the dispersion degree is less than 2.7, there are cases in which the generation of burrs during molding increases. The upper limit of the dispersion degree (Mw/Mn) is not particularly limited but is preferably 10 or less. Here, the weight-average molecular weight (Mw) and number-average molecular weight (Mn) are calculated values expressed in terms of polystyrene using gel permeation chromatography (GPC). 1-chloronaphthalene was used as the solvent, and the column temperature was set to 210° C.

The method for producing the polyarylene sulfide resin is not particularly limited, and polymerization is carried out using a known method, although examples of particularly suitable polymerization methods include the production methods disclosed in U.S. Pat. No. 4,746,758, No. 4,786,713, Japanese Unexamined Patent Application Publication No. 2013-522385, Japanese Laid Open Patent Application No. 2012-233210, and Japanese Patent No. 5167276. These production methods are methods in which a diiodoaryl compound and solid sulfur are polymerized by directly heating without introducing a polar solvent.

The production methods described above include an iodination step and a polymerization step. In the iodination step, an aryl compound is reacted with iodine to obtain a diiodoaryl compound. In the subsequent polymerization step, the diiodoaryl compound and solid sulfur are subjected to a polymerization reaction using a polymerization terminator to produce polyarylene sulfide resin. The iodine is generated in this step in a gaseous state and is recovered and used again in the iodination step. The iodine is substantially a catalyst.

A representative solid sulfur that is used in the production methods described above is the cycloocta sulfur form (Ss) in which eight atoms are connected at room temperature. However, the sulfur compound to be used in the polymerization reaction is not limited, and any form that is solid or liquid at room temperature can be used.

Examples of representative diiodoaryl compounds to be used in the production methods described above include at least one type selected from a group comprising diiodobenzene, diiodonaphthalene, diiodobiphenyl, diiodobisphenol, and diiodobenzophenone; in addition, a derivative of an iodoaryl compound to which an alkyl group or a sulfone group is bonded, or in which oxygen or nitrogen is introduced, also can be used. Iodoaryl compounds are classified into different isomers depending on the bonding position of the iodine atoms thereof, and preferred examples of these isomers are compounds in which iodine is positioned symmetrically at both ends of the aryl compound molecules, such as p-diiodobenzene, 2,6-diiodonaphthalene, and p,p'-diiodobiphenyl. The content of the iodoaryl compound is preferably 500 to 10,000 parts per weight with respect to 100 parts per weight of the solid sulfur. This amount is determined with consideration given to the generation of disulfide bonds.

Examples of representative polymerization terminators to be used in the production methods described above include monoiodoaryl compounds, benzothiazoles, benzothiazole sulfenamides, thiurams, dithiocarbamates, and aromatic sulfide compounds. Preferable examples of monoiodoaryl compounds include at least one type selected from a group comprising iodobiphenyl, iodophenol, iodoaniline, and iodobenzophenone. Preferable examples of benzothiazoles include at least one type selected from a group comprising 2-mercaptobenzothiazole and 2,2'-dithiobisbenzothiazole. Preferable examples of benzothiazole sulfenamides include at least one type selected from a group comprising N-cyclohexylbenzothiazole 2-sulfenamide, N,N-dicyclohexyl-2-benzothiazole sulfenamide, 2-morpholinothiobenzothiazole, benzothiazole sulfenamide, dibenzothiazole disulfide, and N-dicyclohexyl benzothiazole 2-sulfenamide. Preferable examples of thiurams include at least one type selected from a group comprising tetramethylthiuram mono sulfide and tetramethylthiuram disulfide. Preferable examples of dithiocarbamates include at least one type selected from a group comprising zinc dimethyldithiocarbamate and zinc diethyldithiocarbamate. Preferable examples of aromatic sulfide compounds include at least one type selected from a group comprising diphenyl sulfide, diphenyl disulfide, diphenyl ether, biphenyl, and benzophenone. In addition, in any of the polymerization terminators, one or a plurality of functional groups may be substituted on the conjugated aromatic ring skeleton. Examples of the functional group described above include hydroxyl groups, carboxy groups, mercapto groups, amino groups, cyano groups, sulfo groups, and nitro groups, of which preferable examples include carboxy groups and amino groups, and more preferable examples include carboxy groups and amino groups that show peaks at 1600-1800 $cm^{-1}$ or 3300-3500 $cm^{-1}$ on an FUR spectrum. The content of the polymerization terminator is preferably 1-30 parts per weight with respect to 100 parts per weight of the solid sulfur. This amount is determined with consideration given to the generation of disulfide bonds.

In the production methods described above, a polymerization reaction catalyst may be used, and a representative example of a polymerization reaction catalyst is a nitrobenzene-based catalyst. Preferable examples of nitrobenzene-based catalysts include at least one type selected from a group comprising 1,3-diiodo-4-nitrobenzene, 1-iodo-4-nitrobenzene, 2,6-diiodo-4-nitrophenol, iodonitrobenzene, and 2,6-diiodo-4-nitroamine. The content of the polymerization reaction catalyst is preferably 0.01-20 parts per weight with respect to 100 parts per weight of the solid sulfur. This amount is determined with consideration given to the generation of disulfide bonds.

By using this polymerization method, it is substantially unnecessary to reduce the chlorine content and the sodium content, and it is possible to obtain a polyphenylene sulfide resin with excellent cost-effectiveness.

In addition, the polyphenylene sulfide resin of the present invention may contain polyphenylene sulfide resin obtained using other polymerization methods.

Component B: Glass Fibers

The glass fibers used of the present invention are well-known to a person skilled in the art and can be obtained from numerous vendors. Glass fibers mainly improve sound quality by imparting rigidity to the device for a fishing reel of the present invention but are also thought to contribute to the deterioration of sound.

The glass fibers to be used in the present invention are not limited to a particular glass composition, such as A-glass, C-glass, and E-glass, and may optionally contain components such as $TiO_2$, $SO_3$, and $P_2O_5$. However, it is more preferable if E-glass (alkali-free glass) is blended with a thermoplastic resin. Glass fibers are obtained by rapidly cooling molten glass while stretching the molten glass using various methods to obtain a prescribed fibriform. The rapid cooling and stretching conditions in such a case are also not particularly limited. Furthermore, in addition to a true circle, the shape of the cross-section may be a shape other than a perfect circle, such as an elliptical shape, a cocoon shape, a trilobal shape, and the like. Furthermore, a mixture of true circular glass fibers and glass fibers having a shape other than a true circle may be used as well. More preferable among the above is a true circular glass fiber. In addition, using these glass fibers by pretreating with a coupling agent, such as an isocyanate compound, an organosilane compound, an organic titanate compound, an organoborane compound, or an epoxy compound, or with an organic onium ion in the case of a swellable layered silicate, is preferable in terms of obtaining a superior mechanical strength.

The fiber diameter of the glass fibers to be used is preferably 3-12 μm, more preferably 5-10 μm, and even more preferably 6-9.5 μm. The fiber diameter is measured using the method described below. That is, a glass fiber is placed on a deck glass and the fiber is uniformly opened using methanol to sufficiently volatilize the solvent, and then measured using a Nikon HFX-2 type microscope manufactured by Nippon Kogaku Kogyo Co., Ltd., using a 40× objective lens and a 10× eyepiece lens (n=25). If the fiber diameter is less than 3 μm, it is not practical because the cost of the glass fibers increases, and if the fiber diameter exceeds 12 μm, there are cases in which a high-quality sound is not generated.

The content of the glass fibers is 10-300 parts per weight, preferably 20-200 parts per weight, and more preferably 30-80 parts per weight, with respect to 100 parts per weight of component A. If the additive amount is large, the extrusion performance is significantly deteriorated, and if the additive amount is small, the sound quality of the device for a fishing reel decreases and, when used for a long period of time, the sound will also deteriorate progressively.

Component C: Aramid Fibers

Any aramid fiber belonging to a category referred to as aramid fibers may be used as component C of the present invention. The aramid fiber to be used in the present invention mainly prevents deterioration of sound when used for a long period of time by imparting sliding performance to the device for a fishing reel of the present invention but is also thought to contribute to the improvement in sound quality.

The aramid fibers to be used as component C of the present invention are preferably wholly aromatic aramid fibers. Examples of aramid fibers include meta-aramid fibers and para-aramid fibers.

A wholly aromatic aramid resin, which is the raw material of wholly aromatic aramid fibers, is substantially obtained from one or more types of aromatic diamines and one or more types of aromatic dicarboxylic acid halides. However, for example, it is also possible to add a condensing agent represented by, for example, a system of triphenyl phosphite and pyridine to one or more types of aromatic diamines and one or more types of aromatic dicarboxylic acids. The aramid may be para type or meta type, but the para type is more preferable. Examples of preferred aromatic diamines include p-phenylenediamine, benzidine, 4,4''-diamino-p-terphenyl, 2,7-diaminofluorene, 3,4-diaminodiphenyl ether, 4,4'-diaminodiphenyl ether, 1,4-bis-(4-aminophenoxy) benzene, 4,4'-bis-(4-aminophenoxy) biphenyl, and 9,10-bis-(4-aminophenyl) anthracene.

As the aromatic dicarboxylic acid halide, the acid chloride is particularly preferable examples of which include terephthalic acid chloride, 2,6-naphthalene dicarboxylic acid chloride, and 4,4'-diphenyl dicarboxylic acid chloride, as well as those containing one or more nonreactive functional groups, such as a lower alkyl group, a lower alkoxy group, a halogeno group, or a nitro group, in the aromatic ring thereof. Furthermore, if using an aromatic dicarboxylic acid, examples include terephthalic acid, 2,6-naphthalene dicarboxylic acid, and 4,4'-diphenyl dicarboxylic acid, and those containing one or more nonreactive functional groups, such as a lower alkyl group, a lower alkoxy group, a halogeno group, or a nitro group, in the aromatic ring thereof. In addition, the structure of a preferable aramid of the present invention is one in which the main skeleton thereof is represented by the following formula.

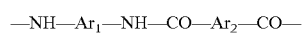                                   Formula 1

$Ar_1$ and $Ar_2$ represent at least one aromatic residue selected from a group comprising the following general formulas [I] to [IV]. $Ar_1$ and $Ar_2$ may be identical to or different from each other.

In addition, some of the hydrogen atoms of these aromatic residues may be substituted with a halogen atom or a lower alkyl group.

Formula 2

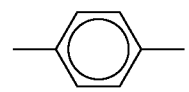

[I]

Formula 3

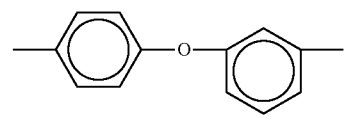

[II]

Formula 4

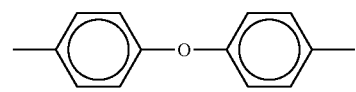

[III]

Formula 5

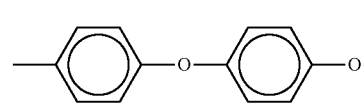

[IV]

Among the above, when the total of $Ar_1$, $Ar_2$ above is 100 mol %, the total of general formula [I] and general formula [II], the total of general formula [I] and general formula [III] the total of general formula [I] and general formula [IV], or general formula [I] is preferably 80 mol % or more. More preferably, the total of general formula [I] and general formula [II] or the total of general formula [I] and general formula [III] is 80 mol % or more. Even more preferably, the total of general formula [I] and general formula [III] or the total of general formula [I] and general formula [III] is 80 mol % or more, and general formula [II] or general formula [III] is 1-20 mol %.

The aramid dope to be used as the spinning solution may be obtained by solution polymerization or by dissolving a separately obtained wholly aromatic aramid resin in a solvent, but it is preferably obtained by carrying out a solution polymerization reaction. In addition, a small amount of inorganic salt may be added as a dissolution aid. Examples of such inorganic salts include lithium chloride and calcium chloride.

Commonly well-known aprotic organic polar solvents are used as the polymerization solvent or the redissolving solvent, examples of which include N-methyl-2-pyrrolidone, N-ethyl-2-pyrrolidone, N,N-dimethylformamide, N,N-dimethylacetamide, N,N-diethylacetamide, N,N-dimethylpropionamide, N,N-butyramide, N,N-dimethylisobutyramide, N-methyl caprolactam, N,N-dimethylmethoxyacetamide, N-acetylpyrrolidine, N-acetylpiperidine, N-methylpiperidone-2, N,N'-dimethylethylene urea, N,N'-dimethylpropylene urea, N,N,N',N'-tetramethylmalonamide, N-acetyl pyrrolidone, N,N,N',N'-tetramethylurea, and dimethylsulfoxide, and further examples of redissolving solvents include strong acids such as concentrated sulfuric acid and methanesulfonic acid.

The polymerization degree of the wholly aromatic aramid resin is not particularly limited, although a higher polymerization degree is preferable if dissolving in a solvent. When subjecting a wholly aromatic aramid resin to solution polymerization, the reaction is carried out by substantially setting the ratio between the acid component and the diamine component to be an equivalent molar ratio, although one of the components may be used in excess in order to control the polymerization degree. In addition, a monofunctional acid component or amine component may be used as a terminal blocking agent.

When forming a wholly aromatic aramid resin into a fibriform, typically a method of wet-forming of an aramid dope is used, examples of which include a method of directly discharging said dope into a coagulation bath and a method of discharging the dope into a coagulation bath provided with an air gap. A poor solvent of wholly aromatic aramid resin is used as the coagulation bath, but usually a good solvent is added to adjust the coagulation rate so that the aramid dope solvent will not rapidly flow out and cause a defect in the wholly aromatic aramid fibers. Generally, water is preferably used as the poor solvent and an aramid dope solvent is used as the good solvent. The ratio of good solvent/poor solvent depends on the coagulability and solubility of the wholly aromatic aramid resin and is preferably 15/85 to 40/60.

The fiber length of such wholly aromatic aramid fibers is preferably 0.1 mm-6 mm, and more preferably 0.5 mm-3 mm. The fiber length is most preferably 0.7 mm-1.5 mm. If the fiber length exceeds 6 mm, handling during manufacture is difficult and there are cases in which the flowability of the composition is inferior, resulting in poor moldability. In addition, because it requires a long cooling time, productivity can be reduced. If the fiber length is less than 0.1 mm, the productivity of the aramid fiber itself becomes poor such that it is not realistic.

In addition, wholly aromatic aramid fibers exert an effect regardless of the presence/absence of bundling, but those that are bundled are easier to handle and thus are preferable. Examples of binders for bundling include polyester, polyurethane, and polyethersulfone resin, of which aromatic polyester is preferable. In the present invention, such heat-resistant organic fibers may be used alone or as a mixture of two or more types.

The content of component C is 1-100 parts per weight, preferably 10-80 parts per weight, and more preferably 10-60 parts per weight, with respect to 100 parts per weight of component A. If the content of component C is less than 1 part per weight, sound quality is deteriorated, and the sound deteriorates when used for a long period of time; if it exceeds 100 parts per weight, strand breakage and surging occur during kneading extrusion, raising the problem of reduced productivity.

Component D: Fluororesin

The fluororesin to be used as component D of the present invention is a polymer that includes a carbon chain in the main chain and a fluorine atom bond in the side chain, or a copolymer that includes such a polymer. The fluororesin to be used in the present invention is thought mainly to prevent deterioration of sound when used for a long period of time by imparting sliding performance to the device for a fishing reel of the present invention.

Specific examples of the fluororesin used as component D of the present invention include polytetrafluoroethylene, tetrafluoroethylene-perfluoroalkylvinylether copolymers, tetrafluoroethylene-hexafluoropropylene copolymers, ethylene-tetrafluoroethylene copolymers, tetrafluoroethylene-fluoroalkyl vinyl ether-fluoroolefin copolymers, and ethylene-trichlorofluoroethylene copolymers. Of the above, polytetrafluoroethylene is preferable, and both baked and unbaked polytetrafluoroethylene can be used; however, because polytetrafluoroethylene easily reagglomerates, powder forms subjected to calcination treatment, etc. are preferable to discourage reagglomeration, and polytetrafluoroethylene resin that is calcined at a firing temperature of 360° C. or higher is particularly preferable. The melting point of the polytetrafluoroethylene is preferably 320-335° C., and more preferably 325-330° C., as measured using the DSC method, in order to make reagglomeration difficult. The particle diameter of the polytetrafluoroethylene is preferably 0.1-100 μm on average, and more preferably 1 μm-20 μm, according to a method of measuring a dispersion liquid in which the particles are dispersed in perchlorethylene according to the light transmission method. The average particle diameter here refers to the weight average particle diameter measured using the laser diffraction/scattering method (MICOTRAC method). In addition, the number-average molecular weight of this polytetrafluoroethylene is preferably 100,000 or more, and more preferably 200,000 or more.

Commercially available examples of such polytetrafluoroethylene that can be easily obtained include KTL-620 and KTL-450A from Kitamura Corporation, Lubron L-5 and L-2 from Daikin Industries, Ltd., L150J, L169J, L170J, and L172J from Asahi ICI-Fluoropolymers Co., Ltd., and Teflon TLP-10E-1 from Du Pont-Mitsui Fluorochemicals Co., Ltd.

The content of component D is 5-100 parts per weight, preferably 5-80 parts per weight, and more preferably 5-35 parts per weight, with respect to 100 parts per weight of component A. If the content is less than 5 parts per weight, the sound quality deteriorates, and a sufficient sliding improvement effect cannot be obtained, leading to deterioration of sound when used for a long period of time; on the other hand, if the content exceeds 100 parts per weight, strand breakage and surging tend to occur during kneading.

Other Components

The resin composition of the present invention may contain other components. Specific examples include fibrous fillers other than component B and component C, such as carbon fibers, potassium titanate whiskers, zinc oxide whiskers, alumina fibers, silicon carbide fibers, ceramic fibers, asbestos fibers, stone glass fibers, and metal fibers; silicates such as wollastonite, sericite, kaolin, mica, clay, bentonite, asbestos, talc, and alumina silicate; swelling lamellar silicates such as montmorillonite and synthetic mica; metal compounds such as alumina, silicon oxide, magnesium oxide, zirconium oxide, titanium oxide, and iron oxide; carbonates such as calcium carbonate, magnesium carbonate, and dolomite; sulfates such as calcium sulfate and barium sulfate; and non-fibrous fillers such as glass beads, ceramic beads, boron nitride, silicon carbide, calcium phosphate, and silica, which may be hollow, and two or more types of these fillers may also be used in combination.

In addition, using these fillers by pretreating with a coupling agent, such as an isocyanate compound, an organosilane compound, an organic titanate compound, an organoborane compound, or an epoxy compound, or with an organic onium ion in the case of a swellable layered silicate, is preferable in terms of obtaining a superior mechanical strength.

Examples of fillers that impart conductivity to the resin composition of the present invention include conductive fillers. The conductive filler is not particularly limited as long as the conductive filler is normally used for making resin conductive, and specific examples thereof include metal powders, metal flakes, metal ribbons, metal fibers, metal oxides, conductive substance-coated inorganic fillers, carbon powders, graphite, carbon fibers, carbon flakes, and flaky carbon. Specific examples of the type of metal among the metal powders, metal flakes, and metal ribbons include silver, nickel, copper, zinc, aluminum, stainless steel, iron, brass, chromium, and tin. Specific examples of the type of metal include iron, copper, stainless steel, aluminum, and brass. The surface of such metal powders, metal flakes, metal ribbons, and metal fibers may be treated using, for example, titanate-, aluminum-, and silane-type surface treatment agents.

Specific examples of the metal oxides include $SnO_2$ (antimony doped), $In_2O_3$ (antimony doped), and ZnO (aluminum doped), and the surface thereof may be treated using surface treatment agents such as titanate-, aluminum-, and silane-type coupling agents.

Specific examples of conductive substances in the inorganic filler coated with a conductive substance include aluminum, nickel, silver, carbon, $SnO_2$ (antimony doped), and $In_2O_3$ (antimony doped). In addition, examples of the coated inorganic fillers include mica, glass beads, glass fibers, carbon fibers, potassium titanate whiskers, barium sulfate, zinc oxide, titanium oxide, aluminum borate whiskers, zinc oxide whiskers, titanic acid whiskers, and carbonized silicon whiskers. Examples of the coating method include the vacuum deposition method, the sputtering method, the electroless plating method, and the baking method. The surfaces of the above may be treated using surface treatment agents such as titanate-, aluminum-, and silane-type coupling agents.

Carbon powders are classified by the raw material and production method thereof into, for example, acetylene black, gas black, oil black, naphthalene black, thermal black, furnace black, lamp black, channel black, roll black, and disk black. The raw material and the production method of the carbon powder that can be used in the present invention are not particularly limited, but acetylene black and furnace black are particularly suitable for use.

Production of the Resin Composition

The resin composition of the present invention can be produced by mixing the components described above at the same time, or in any order, using a mixer such as a tumbler, a V-type blender, a Nauta mixer, a Banbury mixer, a kneading roll, or an extruder. Melt kneading using a twin screw extruder is preferable, and if necessary, optional components are preferably supplied to the other components that have been melt-mixed from a second supply port using a side feeder, or the like.

Resin extruded in the manner described above is directly cut and made into pellets, or a strand is formed therefrom and the strand is cut using a pelletizer to form the pellets. Upon pelletization, if it is necessary to reduce the influence of external dust, and the like, it is preferable to purify the atmosphere surrounding the extruder. The shape of the obtained pellets may be a general shape such as a cylinder, a prism, and a spherical shape, and is preferably a cylinder. The diameter of such a cylinder is preferably 1-5 mm, more preferably 1.5-4 mm, and even more preferably 2-3.5 mm. On the other hand, the length of the cylinder is preferably 1-30 mm, more preferably 2-5 mm, and even more preferably 2.5-4 mm.

The total chlorine content of the resin composition of the present invention is preferably 500 ppm or less, more preferably 300 ppm or less, and even more preferably 50 ppm or less. If the total chlorine content exceeds 500 ppm, there are cases in which the amount of gas generated increases and the weld strength decreases.

The total sodium content of the resin composition of the present invention is preferably 39 ppm or less, more preferably 30 ppm or less, even more preferably 10 ppm or less, and most preferably 8 ppm or less. If it exceeds 39 ppm, not only does the weld strength decrease due to an increase in gas generated, but there also are cases in which, in a high temperature, high humidity environment, the wet heat resistance decreases due to an increase in the water absorption amount of the resin due to coordinate bonds between the sodium metal and water molecules.

Regarding the Molded Article

The molded article made using the resin composition of the present invention can be obtained by forming pellets that are produced as described above. Preferably, the molded article is obtained by injection molding or extrusion molding. Examples of injection molding include not only the usual molding method, but also injection compression molding, injection press molding, gas-assist injection molding, foam molding (including a method of injecting supercritical fluid), insert molding, in-mold-coating molding, heat-insulating molding, rapid heating/cooling molding, two-color molding, multicolor molding, sandwich molding, and ultra-high-speed injection molding. In addition, both the cold runner method and the hot runner method can be selected for the molding. In addition, various profile extrusion molded articles, sheets, films, and the like can be obtained by extrusion molding. The inflation method, the calender method, the casting method, and the like can also be used for forming sheets or films. It is also possible to carry out the molding of a heat shrinkable tube by applying a specific stretching operation. In addition, the resin composition of the present invention can be formed into a molded article by means of rotational molding, blow molding, or the like.

The mode of the present invention that the present inventor currently considers to be most preferable would be a combination of the preferable ranges of the requirements described above; representative examples are described in the Examples below. Of course, the present invention is not limited to these forms.

Examples 1-14, Comparative Examples 1-6

Each of the components listed in Table 1 and Table 2 was mixed at the mixing ratios shown in the tables, and component A, component C, and component D were supplied using a vent type twin screw extruder (TEX30XSST, Japan Steel Works, Ltd.) having a diameter of 30 mmφ, from a first inlet at the base of the screw, using a stirring blade type feeder provided on a measuring instrument (CWF manufactured by Kubota Corporation). On the other hand, component B was supplied to a side feeder so as to be maintained at a prescribed ratio using a vibrating type feeder provided on the measuring device in the same manner. Extrusion was carried out with both the cylinder and die at a temperature of 320° C., and a strand was produced under the conditions of a screw rotational speed of 250 rpm, a discharge amount of 16 kg/hour, and with vent suctioning carried out at 6 kPa, which strand was then pelletized using a pelletizer.

Evaluation of Sound

Figure 13:
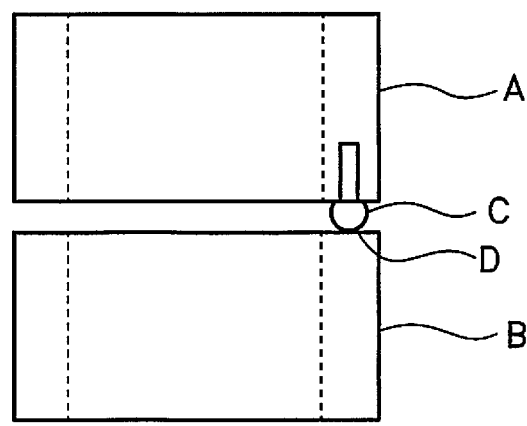
FIG. 13 is a schematic view of the method of evaluating sound.

Pellets prepared according to the above-described method were dried at 130° C. for 6 hours and then subjected to injection molding at a molding temperature of 320° C., a metal mold temperature of 145° C., and an injection pressure of 30 MPa, using an injection molding machine [T-150D manufactured by FANUC Co., Ltd.], to form a hollow cylindrical test piece as described in JIS K7218. The hollow cylindrical test piece made of resin is provided with concavities and convexities having a height of 0.35 mm and a pitch of 2 mm on the sliding surface. Next, a hole was formed on the sliding surface of the hollow cylindrical test piece made of SUS304 having the same size as the hollow cylindrical test piece made of resin, and a striking pin made of SUS 304 (distal end r=1 mm) was attached thereto, and, as shown in FIG. 13, after disposing the striking pin to come in contact with the sliding surface of the hollow test piece made of resin to which the concavities and convexities were provided, a load of 200 N was applied thereto, the concavities and convexities of the sliding surface of the hollow cylindrical test piece were struck by the striking pin at a speed of 320 m/h, and the sound generated at this time was evaluated.

The evaluation was carried out by ten judges, each scoring out of a maximum of 10 points, where a metallic tone having good resonance was scored a perfect 10, a metallic tone having a slightly poor resonance was scored an 8, no metallic tone was scored a 6, a plastic tone was scored a 4, no resonance of a plastic tone was scored a 2, and no sound was scored a 0; scoring was carried out in 11 steps that included the respective intermediate points, and the average of the ten judges was calculated. The evaluation of the sound was preferably 9 points or more. Evaluation was carried out after completion of the initial test and, continuously for 50 hours, the test described above.

Evaluation of Moldability

Rings having an outer diameter of 35 mm, an inner diameter of 25 mm, and a thickness of 1.3 mm were molded by a four-point pin gate two-cavity mold at a cylinder temperature of 300° C., a metal mold temperature of 130° C., and an injection pressure of 30 MPa, using an injection molding machine (P40T manufactured by Nissei Limited). The shortest molding cycle in which the sprue did not stick during molding was measured.

The evaluation results are shown in Table 1 and Table 2.

TABLE 1

| | | Examples | | | | | | | | | | | | | |
|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 |
| Component A (Parts per weight) | PPS 1 | 100 | 100 | 100 | 100 | 100 | 100 | 100 | 100 | 100 | 100 | 100 | | 100 | 100 |
| | PPS 2 | | | | | | | | | | | | 100 | | |
| Component B (Parts per weight) | GF 1 | 42 | | | 42 | 60 | 200 | 60 | | 20 | 42 | 42 | 42 | 42 | 42 |
| | GF 2 | | 42 | | | | | | | | | | | | |
| | GF 3 | | | 42 | | | | | | | | | | | |
| | GF 4 | | | | | | | | 42 | | | | | | |
| Component C (Parts per weight) | AF 1 | 8 | 8 | 8 | | 80 | 20 | 20 | 8 | 8 | 8 | 8 | 8 | | 8 |
| | AF 2 | | | | 8 | | | | | | | | | | |
| | AF 3 | | | | | | | | | | | | | 8 | |
| Component D (Parts per weight) | PTFE 1 | 16 | 16 | 16 | 16 | 16 | 35 | 30 | 16 | 16 | 10 | 80 | 16 | 16 | |
| | PTFE 2 | | | | | | | | | | | | | | 16 |
| Evaluation of sound (—) | Initial | 9.8 | 9.5 | 9.2 | 9.4 | 9.1 | 9.0 | 9.1 | 9.7 | 9.6 | 9.5 | 9.1 | 9.7 | 9.6 | 9.7 |
| | After 50 hours | 9.6 | 9.4 | 9.1 | 9.2 | 9.0 | 8.9 | 9.0 | 9.5 | 9.4 | 9.1 | 8.8 | 9.4 | 9.3 | 9.2 |
| | Deterioration | 0.2 | 0.1 | 0.1 | 0.2 | 0.1 | 0.1 | 0.1 | 0.2 | 0.2 | 0.4 | 0.3 | 0.3 | 0.3 | 0.5 |
| | Moldability (seconds) | 31 | — | — | 47 | — | — | — | — | — | — | — | — | — | — |

TABLE 2

| | | Comparative example | | | | | |
|---|---|---|---|---|---|---|---|
| | | 1 | 2 | 3 | 4 | 5 | 6 |
| Component A (Parts per weight) | PPS 1 | 100 | 100 | 100 | 100 | 100 | 100 |
| | PPS 2 | | | | | | |
| Component B (Parts per weight) | GF 1 | 42 | | 42 | 320 | 42 | 42 |
| | GF 2 | | | | | | |
| | GF 3 | | | | | | |
| | GF 4 | | | | | | |
| Component C (Parts per weight) | AF 1 | | 8 | 8 | 8 | 110 | 8 |
| | AF 2 | | | | | | |
| | AF 3 | | | | | | |
| Component D (Parts per weight) | PTFE 1 | 16 | 16 | | 16 | 16 | 110 |
| | PTFE 2 | | | | | | |

TABLE 2-continued

| | | Comparative example | | | | | |
|---|---|---|---|---|---|---|---|
| | | 1 | 2 | 3 | 4 | 5 | 6 |
| Evaluation of sound (—) | Initial | 8.8 | 5.6 | 8.9 | Extrusion impossible | | |
| | After 50 hours | 7.2 | 4.8 | 6.6 | | | |
| | Deterioration | 1.6 | 0.8 | 2.3 | | | |
| Moldability | | — | — | — | | | |

Component A PPS 1: PPS resin ECOTRAN N060 manufactured by INITZ PPS 2: MA-510 manufactured by DIC Corporation
Component B GF 1: 3 mm cut, 9 μm fiber diameter ECS 03-630 manufactured by Central Glass Fiber Co., Ltd. GF 2: 3 mm cut, 10.5 μm fiber diameter T-732H, manufactured by Nippon Electric Glass Co., Ltd. GF 3: 3 mm cut, 13 μm fiber diameter 3PE-944, manufactured by Nitto Boseki Co., Ltd. GF 4: 3 mm cut, 6 μm fiber diameter T-790DE made by Nippon Electric Glass Co., Ltd.
Component C AF 1: TECHNORA T322EH 1-12, fiber length 1 mm, manufactured by Teijin Ltd. AF 2: TECHNORA T322EH 3-12, fiber length 3 mm, manufactured by Teijin Ltd. AF 3: Conex B 2.2 × 1, fiber length 1 mm manufactured by Teijin Ltd.
Component D PTFE 1: KTL-620 manufactured by Kitamura Corporation PTFE 2: Lubron L-5 manufactured by Daikin Industries, Ltd.

As made clear in Tables 1 and 2, test pieces of the Examples consisting of a resin composition in which polyarylene sulfide resin (component A) contains glass fibers (component B), aramid fibers (component C), and fluororesin (component D) displayed good sound both initially and after 50 hours, showed little deterioration, and deterioration of sound was 0.5 or less. In addition, the resin composition used in the Examples had good moldability.

In contrast, the test piece of Comparative Example 2 consisting of a resin composition in which polyarylene sulfide resin (component A) contains aramid fibers (component C) and fluororesin (component D), but does not contain glass fibers (component B), the sound was poor both initially and after 50 hours.

Furthermore, the test piece of Comparative Example 1 consisting of a resin composition in which polyarylene sulfide resin (component A) contains glass fibers (component B) and fluororesin (component D) but does not contain aramid fibers (component C), and the test piece of Comparative Example 3 consisting of a resin composition in which polyarylene sulfide resin (component A) contains glass fibers (component B) and aramid fibers (component C) but does not contain fluororesin (component D), displayed relatively good sound initially, albeit inferior compared to the test pieces of the Examples, although the deterioration of sound after 50 hours was significant, that is, 1.6 or more.

What is claimed is:

1. A device for a fishing reel comprising:
a resin composition including
a polyarylene sulfide resin composition (component A),
a glass fibers (component B) containing 10 to 300 parts by weight of the component B based on 100 parts by weight of the component A,
an aramid fibers (component C) containing 1 to 100 parts by weight of the component C based on 100 parts by weight of the component A, and
a fluoric resin (component D) containing 5 to 100 parts by weight of the component D based on 100 parts by weight of the component A.

2. The device for the fishing reel according to claim 1, wherein
the fiber diameter of the component B is 3 to 12 μm.

3. The device for the fishing reel according to claim 1, wherein
the fiber length of the component C is 0.7 to 1.5 mm.

4. The device for the fishing reel according to claim 2, wherein
the fiber length of the component C is 0.7 to 1.5 mm.

5. A drag device for a fishing reel for regulating relative rotation between a drive gear configured to interlock with a spool and a drive shaft, the drag device comprising:
a sound-generating mechanism comprising
a sound generating device configured to be integrally rotated with one of the drive gear or the drive shaft and having a sound-generating portion, and
a sound unit that configured to integrally rotated with an other of the drive gear and the drive shaft and configured to interfere with the sound-generating portion by the relative rotation between the drive gear and the drive shaft to generate sound,
the sound generating device comprises a resin composition including
a polyarylene sulfide resin composition (component A),
a glass fibers (component B) containing 10 to 300 parts by weight of the component B based on 100 parts by weight of the component A,
an aramid fibers (component C) containing 1 to 100 parts by weight of the component C based on 100 parts by weight of the component A, and
a fluoric resin (component D) containing 5 to 100 parts by weight of the component D based on 100 parts by weight of the component A.

6. The drag device for a fishing reel according to claim 5, wherein
the fiber diameter of the component B is 3-12 μm.

7. The drag device for a fishing reel according to claim 5, wherein
the fiber length of the component C is 0.7-1.5 mm.

8. The drag device for a fishing reel according to claim 6, wherein
the fiber length of the component C is 0.7-1.5 mm.

* * * * *